(12) United States Patent
Buckley et al.

(10) Patent No.: US 10,848,410 B2
(45) Date of Patent: Nov. 24, 2020

(54) RANKING SERVICE IMPLEMENTATIONS FOR A SERVICE INTERFACE

(71) Applicant: Oracle International Corporation, Redwood Shores, CA (US)

(72) Inventors: Alexander R. Buckley, Cupertino, CA (US); Eric Sutton, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 645 days.

(21) Appl. No.: 15/472,799

(22) Filed: Mar. 29, 2017

(65) Prior Publication Data

US 2018/0285361 A1   Oct. 4, 2018

(51) Int. Cl.
*H04L 12/26* (2006.01)
*H04L 29/08* (2006.01)
*G06F 9/455* (2018.01)
*G06F 8/41* (2018.01)

(52) U.S. Cl.
CPC ............ *H04L 43/16* (2013.01); *G06F 9/4552* (2013.01); *G06F 9/45516* (2013.01); *H04L 67/16* (2013.01); *G06F 8/41* (2013.01); *G06F 9/45525* (2013.01)

(58) Field of Classification Search
CPC . H04L 43/16; H04L 67/16; G06F 8/41; G06F 9/45525; G06F 9/45516; G06F 9/4552
See application file for complete search history.

(56) References Cited

U.S. PATENT DOCUMENTS

| | | | |
|---|---|---|---|
| 6,286,047 B1 * | 9/2001 | Ramanathan | H04L 29/12066 370/229 |
| 6,883,163 B1 | 4/2005 | Schwabe | |
| 6,951,022 B1 | 9/2005 | Golde et al. | |
| 6,981,245 B1 | 12/2005 | Schwabe | |
| 6,983,460 B1 | 1/2006 | Goire et al. | |

(Continued)

OTHER PUBLICATIONS

Rodrigo Teixeira et al.; Does It Make Sense to Have Application-Specific Code Conventions as a Complementary Approach to Code Annotations; ACM; pp. 15-22; <https://dl.acm.org/citation.cfm?id=3281078>; retrieved on Mar. 15, 2019 (Year: 2018).

(Continued)

*Primary Examiner* — Matthew J Ellis
(74) *Attorney, Agent, or Firm* — Invoke

(57) ABSTRACT

Techniques for ranking service implementations for a service interface are disclosed. Each module that includes a service implementation may be referred to as a "service provider module." The ranking of the service implementations, for the particular service interface, may be based on modular information. Modular information includes information associated with module dependencies and/or service dependencies corresponding to one or more of a candidate set of service provider modules. Additionally or alternatively, the ranking of the service implementations, for the particular service interface, may be based on statically-available information and/or dynamically-available information associated with one or more of a candidate set of service implementations.

30 Claims, 14 Drawing Sheets

(56) References Cited

U.S. PATENT DOCUMENTS

| | | |
|---|---|---|
| 6,986,132 B1 | 1/2006 | Schwabe |
| 7,032,216 B1 | 4/2006 | Nizhegorodov |
| 7,051,323 B2 | 5/2006 | Lam et al. |
| 7,228,532 B1 | 6/2007 | Shaylor et al. |
| 7,243,306 B1 | 7/2007 | Joshi et al. |
| 7,360,206 B1 | 4/2008 | Hatcher |
| 7,434,202 B2 | 10/2008 | Kramer |
| 7,487,507 B1 | 2/2009 | Lun et al. |
| 7,503,031 B2 | 3/2009 | Chang et al. |
| 7,565,364 B1 | 7/2009 | Darcy et al. |
| 7,752,599 B2 | 7/2010 | Takacsi-Nagy et al. |
| 7,840,939 B1 | 11/2010 | Chinnici |
| 7,895,445 B1 | 2/2011 | Albanese et al. |
| 7,966,602 B1 | 6/2011 | Inebster et al. |
| 8,082,542 B2 | 12/2011 | Bottomley et al. |
| 8,307,352 B2 | 11/2012 | Mausolf et al. |
| 9,069,582 B2 | 6/2015 | Mausolf et al. |
| 9,098,715 B1 | 8/2015 | Spear et al. |
| 9,128,789 B1 | 9/2015 | Zorzella et al. |
| 9,292,315 B1 | 3/2016 | Dawson et al. |
| 9,298,448 B2 | 3/2016 | Elia et al. |
| 9,323,501 B1 | 4/2016 | Ielceanu et al. |
| 9,336,018 B2 | 5/2016 | Zhou et al. |
| 9,361,070 B1 | 6/2016 | Nuss |
| 9,489,214 B2 | 11/2016 | Cobb |
| 9,656,171 B2 | 5/2017 | Itsuno |
| 2002/0120717 A1 | 8/2002 | Giotta |
| 2003/0009747 A1 | 1/2003 | Duran |
| 2003/0041167 A1 | 2/2003 | French et al. |
| 2003/0041238 A1 | 2/2003 | French et al. |
| 2003/0101381 A1 | 5/2003 | Mateev et al. |
| 2003/0191864 A1 | 10/2003 | Govindarajapuram et al. |
| 2004/0003079 A1 | 1/2004 | Aiu et al. |
| 2004/0181471 A1 | 9/2004 | Rogers |
| 2005/0050528 A1 | 3/2005 | Wang |
| 2005/0055681 A1 | 3/2005 | Gadre |
| 2005/0055682 A1 | 3/2005 | Gadre et al. |
| 2005/0193137 A1 | 9/2005 | Farnham |
| 2005/0198624 A1 | 9/2005 | Chipman |
| 2005/0216885 A1 | 9/2005 | Ireland |
| 2006/0026126 A1 | 2/2006 | Cabillic |
| 2006/0074989 A1 | 4/2006 | Laborczfalvi et al. |
| 2006/0101092 A1 | 5/2006 | Ishida et al. |
| 2006/0190935 A1 | 8/2006 | Kielstra et al. |
| 2006/0265760 A1 | 11/2006 | Daemke et al. |
| 2006/0277456 A1 | 12/2006 | Biberstein et al. |
| 2006/0277523 A1 | 12/2006 | Horen et al. |
| 2006/0288353 A1 | 12/2006 | King et al. |
| 2007/0006141 A1 | 1/2007 | Bracha et al. |
| 2007/0011451 A1 | 1/2007 | Botzum et al. |
| 2007/0011723 A1 | 1/2007 | Chao |
| 2007/0027907 A1 | 2/2007 | Kulkarni et al. |
| 2007/0061456 A1 | 3/2007 | Waris |
| 2007/0192380 A1 | 8/2007 | Tabellion et al. |
| 2007/0192830 A1 | 8/2007 | O'Connor |
| 2007/0288280 A1 | 12/2007 | Gilbert et al. |
| 2008/0010649 A1 | 1/2008 | Grimaud et al. |
| 2008/0022260 A1 | 1/2008 | Kinder et al. |
| 2008/0091792 A1 | 4/2008 | Mei et al. |
| 2008/0127070 A1 | 5/2008 | Barcia et al. |
| 2008/0134154 A1 | 6/2008 | Patel et al. |
| 2008/0134207 A1 | 6/2008 | Chamieh et al. |
| 2008/0172656 A1 | 7/2008 | Russell et al. |
| 2008/0172658 A1 | 7/2008 | Russell et al. |
| 2008/0201705 A1* | 8/2008 | Wookey ............... G06F 8/658 717/175 |
| 2008/0276231 A1 | 11/2008 | Huang et al. |
| 2008/0282266 A1 | 11/2008 | Kabanov |
| 2009/0070792 A1 | 3/2009 | Cable |
| 2009/0100404 A1 | 4/2009 | Chaturvedi et al. |
| 2009/0113406 A1 | 4/2009 | Bandaram et al. |
| 2009/0133001 A1 | 5/2009 | Rozenfeld |
| 2009/0150864 A1 | 6/2009 | Meijer et al. |
| 2009/0164760 A1 | 6/2009 | Sterbenz |
| 2009/0249311 A1 | 10/2009 | Dandamudi et al. |
| 2010/0083004 A1 | 4/2010 | Kirshenbaum |
| 2010/0138820 A1 | 6/2010 | Joshi |
| 2010/0205237 A1* | 8/2010 | El-Nakhily ............ G06F 9/5055 709/203 |
| 2010/0293168 A1* | 11/2010 | Gupta ................. G06F 9/44505 707/748 |
| 2011/0029960 A1 | 2/2011 | Cimadamore et al. |
| 2011/0131561 A1 | 6/2011 | Adams et al. |
| 2011/0145278 A1 | 6/2011 | Maes |
| 2011/0239184 A1 | 9/2011 | Feigen |
| 2011/0271251 A1 | 11/2011 | Buckley et al. |
| 2011/0271254 A1 | 11/2011 | Reinhold et al. |
| 2011/0283256 A1 | 11/2011 | Raundahl et al. |
| 2011/0302565 A1 | 12/2011 | Ferris et al. |
| 2011/0321019 A1 | 12/2011 | Gibbons et al. |
| 2012/0005660 A1 | 1/2012 | Goetz et al. |
| 2012/0036462 A1 | 2/2012 | Schwartz et al. |
| 2012/0096433 A1 | 4/2012 | Reinhold et al. |
| 2012/0117538 A1 | 5/2012 | Buckley |
| 2012/0151505 A1 | 6/2012 | Verissimo De Oliveira |
| 2012/0210308 A1 | 8/2012 | Goetz et al. |
| 2012/0210320 A1 | 8/2012 | Goetz et al. |
| 2012/0272214 A1 | 10/2012 | Goetz et al. |
| 2012/0278797 A1 | 11/2012 | Secrist et al. |
| 2012/0311531 A1 | 12/2012 | Lebert |
| 2012/0317589 A1 | 12/2012 | Foti |
| 2013/0007706 A1 | 1/2013 | Burckart et al. |
| 2013/0125202 A1 | 5/2013 | Sprague et al. |
| 2013/0232469 A1 | 9/2013 | Agarwal |
| 2013/0339926 A1 | 12/2013 | Raundahl et al. |
| 2014/0089907 A1 | 3/2014 | Cabillic et al. |
| 2014/0130020 A1 | 5/2014 | Boshernitsan et al. |
| 2014/0137075 A1 | 5/2014 | Said et al. |
| 2014/0173574 A1 | 6/2014 | Schmidt et al. |
| 2014/0189672 A1 | 7/2014 | Raundahl et al. |
| 2014/0237176 A1 | 8/2014 | Takefman et al. |
| 2014/0245275 A1 | 8/2014 | Elias et al. |
| 2014/0282441 A1 | 9/2014 | Hoban et al. |
| 2014/0351802 A1 | 11/2014 | Elias et al. |
| 2014/0358972 A1 | 12/2014 | Guarrieri et al. |
| 2015/0026703 A1 | 1/2015 | Foti |
| 2015/0089478 A1 | 3/2015 | Cheluvaraju et al. |
| 2015/0113172 A1 | 4/2015 | Johnson et al. |
| 2015/0186129 A1 | 7/2015 | Apte et al. |
| 2015/0331681 A1 | 11/2015 | Rose et al. |
| 2015/0363174 A1 | 12/2015 | Rose et al. |
| 2015/0378752 A1 | 12/2015 | Stoodley |
| 2016/0011982 A1 | 1/2016 | Sandoz et al. |
| 2016/0011992 A1 | 1/2016 | Sandoz et al. |
| 2016/0055014 A1 | 2/2016 | Gallimore et al. |
| 2016/0055344 A1 | 2/2016 | Peterson et al. |
| 2016/0062878 A1 | 3/2016 | Westrelin et al. |
| 2016/0087933 A1 | 3/2016 | Johnson et al. |
| 2016/0098346 A1 | 4/2016 | Pechanec et al. |
| 2016/0148013 A1 | 5/2016 | Taldo et al. |
| 2016/0154658 A1 | 6/2016 | Stoodley |
| 2016/0210445 A1 | 7/2016 | Deaver |
| 2016/0232017 A1 | 8/2016 | Raundahl Gregersen |
| 2016/0344745 A1 | 11/2016 | Johnson et al. |
| 2016/0357586 A1 | 12/2016 | Rose |
| 2017/0024188 A1 | 1/2017 | Buckley et al. |
| 2017/0024196 A1 | 1/2017 | Buckley et al. |
| 2017/0039043 A1 | 2/2017 | Haupt et al. |
| 2017/0063874 A1 | 3/2017 | Buckley et al. |
| 2017/0068520 A1 | 3/2017 | Buckley et al. |
| 2017/0269929 A1 | 9/2017 | Hegarty et al. |
| 2017/0272316 A1 | 9/2017 | Johnson et al. |
| 2017/0295086 A1* | 10/2017 | Dyszynski ............. H04L 45/02 |
| 2018/0227240 A1* | 8/2018 | Liu ..................... H04L 41/0886 |

OTHER PUBLICATIONS

Phyllipe Lima et al.; An Annotation-Based API for Supporting Runtime Code Annotation Reading; ACM; pp. 6-14; <https://dl.acm.org/citation.cfm?id=3141856>; retrieved on Mar. 15, 2019 (Year: 2017).

(56) References Cited

OTHER PUBLICATIONS

Darren Lunn et al.; Combining SADIe and AxsJAX to Improve the Accessibility of Web Content; ACM; pp. 7578; <https://dl.acm.org/citation.cfm?id=1535672>; retrieved on Mar. 15, 2019 (Year: 2009).
Trance, Macphail, "Code Generation using Annotation Processors in the Java language—part 2: Annotation Processors", Available online at <https://deors.wordpress.com/2011/10/08/annotation-processorst>, Oct. 8, 2011, 14 pages.
Stack Overflow, "What's the difference between 'package' and 'module'" (last accessed on Dec. 6, 2016).
Rossberg et al., "Mixin Up the ML Module System", ACM Transactions on Programming Languages and Systems, vol. 35, No. 1, Article 2, Apr. 2013, pp. 2:1-2:84.
Reis et al., "A Module System for C++", Modules SG, Document No. N4047, May 27, 2014, pp. 1-22.
Oracle, "The Java (Trademark) Tutorials", Java Documentation, Available online at <https://docs.oracle.com/javase/tutorial/java/annotations/basics.html>, Copyright 1995, 2015, 2 pages.
Oracle, "Interface Iterable<T>", Java Platform Standard Ed. 8, Available online at <http://docs.oracle.com/javase/8/docs/api/java/lang/Iterable.html>, Copyright 1993, 2016, 3 pages.
Oracle, "Getting Started with the Annotation Processing Tool (apt)", Java, Available online at <http://docs.oracle.com/javase/1.5.0/docs/guide/apt/GettingStarted.html#AnnotationProcessor>, Copyright 2004, 2010, 8 pages.
Oracle and/or its Affiliate, Available online at <https://blogs.oracle.com/darcy/resource/ProjectCoin/CloseableFinder.java>, Copyright 2016, 3 pages.
NetBeans, "What is a module" (last accessed on Dec. 6, 2016).
Morling, Gunnar, "[Jigsaw] Getting Bad Service Configuration File" Error with Annotation Processor, Available online at <http://mail.openjdk.java.net/pipermail/compiler-dev/2016-February/009985.html>, Feb. 9, 2016, 1 page.
McManus et al., "Plugging into the Java Compiler", JavaOne, 2014, 58 pages.
Hidalgo, Jorge, "JavaOne 2014—CON2013—Code Generation in the Java Compiler: Annotation Processors Do the Hard Work", Available online at <http://www.slideshare.net/deors/javaone-2014-con2013-code-generation-in-the-java-compiler-annotation-processors do-the-hard-work>, Oct. 1, 2014, 11 pages.
Github, "jboss-logging", Available online at <https://github.eom/jboss-logging/jboss-logging-tools/blob/2.0.1.Final/processor/srdmain/java/org/jboss/logging/processor/apl/LoggingToolsProcessor.java>, Copyright 2016, 3 pages.
Github, "Dagger 2", Google, Available online at <https://github.com/google/dagger/>, Copyright 2012, 3 pages.
Github, "Dagger 1", Square, Available online at <https://github.com/square/dagger>, Copyright 2012, 2 pages.
Faycal et al., "An Agent Based Encapsulator System for Integrating and Composing Legacy System Functionalities", Proceedings of the 2015 IEEE/WIC / ACM International Conference on Web Intelligence and Intelligent Agent Technology (WI-IAT), vol. 1, Dec. 6-9, 2015, pp. 84-87.
Darcy, Joseph D., "Properties via Annotation Processing", Oracle Weblog, Java, Available online at <https://blogs.oracle.com/darcy/entry/properties_via_annotationjDrocessing>, Sep. 2, 2009, 6 pages.
Darcy, Joseph D., "Project Coin: Bringing it to a Close(able)", Oracle Weblog, Java, Available online at<https://blogs.oracle.com/darcy/enlry/project_coin_bring_close>, Jul. 6, 2010, 5 pages.
Darcy, Joseph D., "JSR 269 Maintenance Review for Java SE 8", Oracle Weblog, Java, Available online at <https://blogs.oracle.com/darcy/tags/annotationprocessing>, Dec. 8, 2013, 9 pages.
Buckley, Alex, "Project Jigsaw: Under the Hood", Java Platform Group, Oracle, Oct. 2015, 62 pages.
Breslav, Andrey, "kapt: Annotation Processing for Kotlin", Kotlin Blog, Available online at <http://blog.jetbrains.com/kotlin/2015/05/kapt-annotation-processing-for-kotlin/>, May 21, 2015, 8 pages.
Breslav, Andrey, "Better Annotation Processing: Supporting Stubs in kapt", Kellin Blog, Available online at <http:/blog.jetbrains.com/kotlin/2015/06/betler-annotation-processing-supporting-stubs-in-kapt/>, Jun. 22, 2015, 6 pages.
Bracha et al., "Mirrors: Design Principles for Meta-level Facilities of Object-Oriented Programming Languages", OOPSLA '04 Proceedings of the 19th annual ACM SIGPLAN conference on Object-oriented programming, systems, Languages, and applications, Oct. 24-28, 2004, 14 pages.

* cited by examiner

Module Graph 508

Module Graph 902

RANKING SERVICE IMPLEMENTATIONS FOR A SERVICE INTERFACE

RELATED APPLICATIONS; INCORPORATION BY REFERENCE

This application is related to U.S. patent application Ser. No. 14/847,800, filed Sep. 8, 2015, and U.S. patent application Ser. No. 14/847,833, filed Sep. 8, 2015; each of which is incorporated by reference in its entirety.

TECHNICAL FIELD

The present disclosure relates to service interfaces. In particular, the present disclosure relates to ranking service implementations for a service interface.

BACKGROUND

A compiler converts source code, which is written according to a specification directed to the convenience of the programmer, to either machine or object code, which is executable directly by the particular machine environment, or an intermediate representation ("virtual machine code/instructions"), such as bytecode, which is executable by a virtual machine that is capable of running on top of a variety of particular machine environments. The virtual machine instructions are executable by the virtual machine in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine resides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
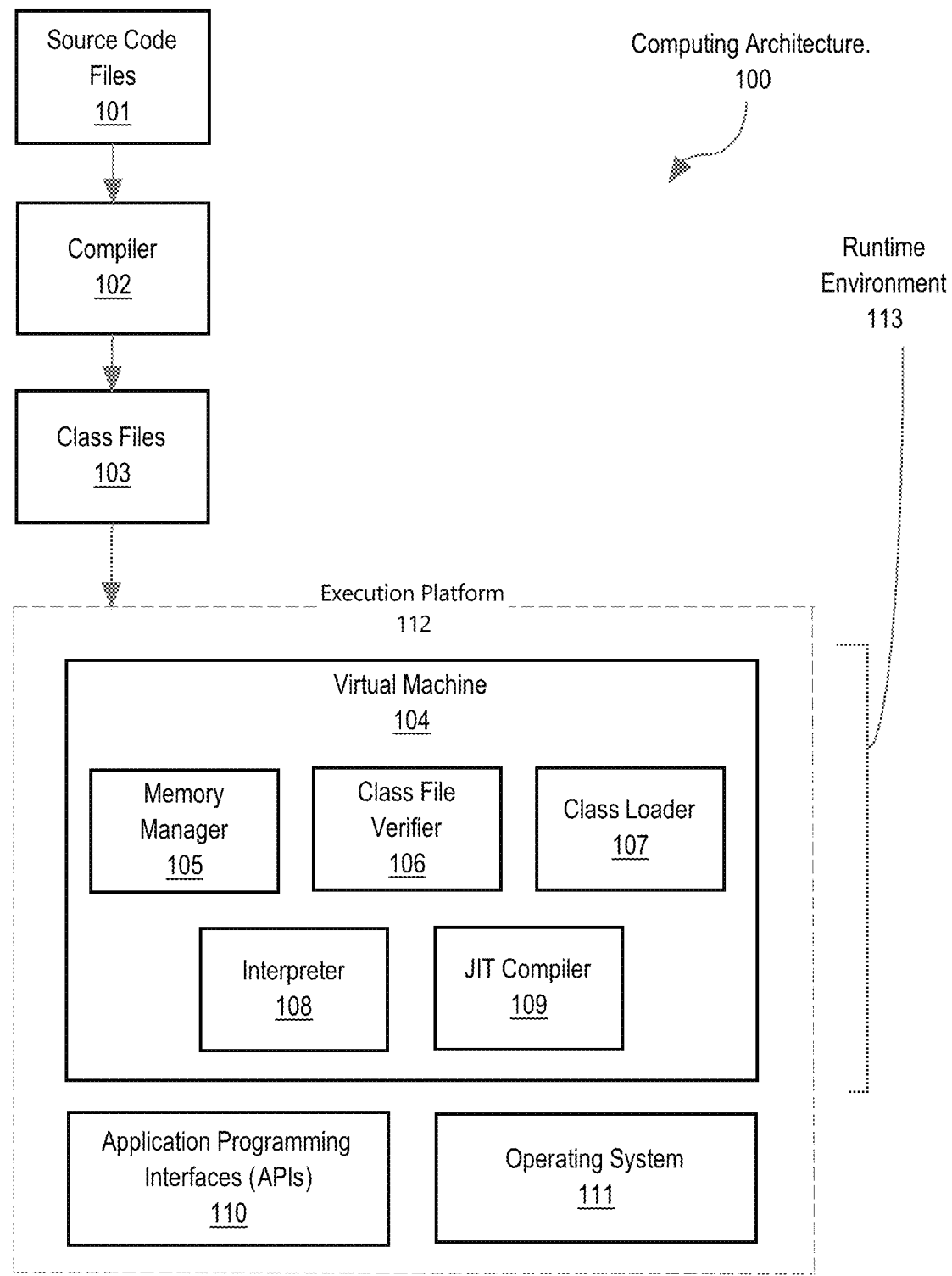
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. SERVICES
4. MODULES
   4.1 MODULE DECLARATIONS
   4.2 MODULE DEPENDENCIES
   4.3 SERVICE DEPENDENCIES
   4.4 MODULE GRAPH EXAMPLES
   4.5 ACCESS CONTROL
5. A SERVICE IMPLEMENTATION SELECTION SYSTEM
6. RANKING SERVICE IMPLEMENTATIONS FOR IMPLEMENTING A PARTICULAR SERVICE INTERFACE BASED ON MODULAR INFORMATION
   6.1 IDENTIFYING A CANDIDATE SET OF SERVICE PROVIDER MODULES
   6.2 IDENTIFYING MODULAR AND OTHER ATTRIBUTES
   6.3 DETERMINING ATTRIBUTE VALUES FOR SERVICE PROVIDER MODULES
   6.4 RANKING SERVICE PROVIDER MODULES
7. RANKING SERVICE IMPLEMENTATIONS FOR IMPLEMENTING A PARTICULAR SERVICE INTERFACE BASED ON STATICALLY-AVAILABLE AND/OR DYNAMICALLY-AVAILABLE INFORMATION
8. MISCELLANEOUS; EXTENSIONS
9. HARDWARE OVERVIEW

1. General Overview

One or more embodiments include ranking service implementations for implementing a particular service interface based on modular information associated with a candidate set of service provider modules. Modular information includes information associated with module dependencies and/or service dependencies corresponding to one or more service provider modules. Instructions to obtain one or more instances of service implementations for a particular service interface are identified in a set of code. A candidate set of service provider modules is identified. One or more attributes associated with module dependencies and/or service dependencies corresponding to each service provider module, in the candidate set of service provider modules, are identified. Based on the attributes, a ranking of the candidate set of service provider modules is generated. A ranked set of instances of service implementations corresponding to the candidate set of service provider modules is returned. The ranked set of instances of service implementations is ranked based on the ranking of the candidate set of service provider modules. One or more instances may be selected from the ranked set based on the positions of the one or more instances in the ranked set. Operations may be performed on the selected instances, such as, accessing a field of the selected instances, or executing a method of the selected instances.

One or more embodiments include ranking service implementations for implementing a particular service interface based on statically-available and/or dynamically-available information associated with a candidate set of service implementations. Instructions to obtain one or more instances of service implementations for a particular service interface are identified in a set of code. A candidate set of service implementations is identified. Statically-available and/or dynamically-available information associated with a candidate set of service implementations is identified. Statically-available information includes one or more attributes associated with at least one of the following: (a) the contents of each service implementation, and (b) the contents of the classes depend upon by each service implementation. Dynamically-available information includes one or more attributes associated with executing (or emulating execution of) each service implementation. In an embodiment, the attributes are not explicitly stated and/or included in any of the candidate set of service implementations. Based on the attributes, a ranking of the candidate set of service implementations is generated. A ranked set of instances of the candidate set of service implementations is returned. The ranked set of instances of service implementations is ranked based on the ranking of the candidate set of service implementations. One or more instances may be selected from the ranked set based on the positions of the one or more instances in the ranked set. Operations may be performed on the selected instances, such as, accessing a field of the selected instances, or executing a method of the selected instances.

The ranking of the service provider modules and/or service implementations indicates which service provider modules and/or service implementations are "better" or "more suitable" for a particular application.

As an example, a particular application may need to have a short response time in order to satisfy customer requirements. The particular application may reference a particular service interface. A service provider module, for the particular service interface, that is more "lightweight" may be more suitable for the particular application. Whether a service provider module is "lightweight" may be defined by, for example, the number of modules directly or indirectly depended upon by the service provider module, or the number of service interfaces directly or indirectly used by the service provider module, or a code footprint corresponding to the service provider module. A candidate set of service provider modules, for the particular service interface, is ranked based on how lightweight each service provider module is. An object whose type is that of a service implementation corresponding to the most lightweight service provider module may be instantiated and/or selected. Operations may be performed on the object. In other examples, more than one instance of one service implementation, for the particular service interface, may be selected and operated upon.

As another example, a particular application may need to be satisfy high security standards. The particular application may reference a particular service interface. A service provider module, for the particular service interface, that is more "secure" may be more suitable for the particular application. Whether a service provider module is "secure" may be determined based on, for example, a source of the service provider module as well as sources of modules directly or indirectly depended upon the service provider module. A set of reliable sources of code may be stored in a list and/or database. The source of a particular service provider module and the sources of modules directly or indirectly depended upon by the particular service provider module are compared against the set of reliable sources. A candidate set of service provider modules, for the particular service interface, is ranked based on whether the sources associated with each service provider module is found within the set of reliable sources of code. An object whose type is that of a service implementation corresponding to the service provider module that is associated with the highest number of reliable sources may be instantiated and/or selected. Operations may be performed on the object. In other examples, more than one instance of one service implementation, for the particular service interface, may be selected and operated upon.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C #, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
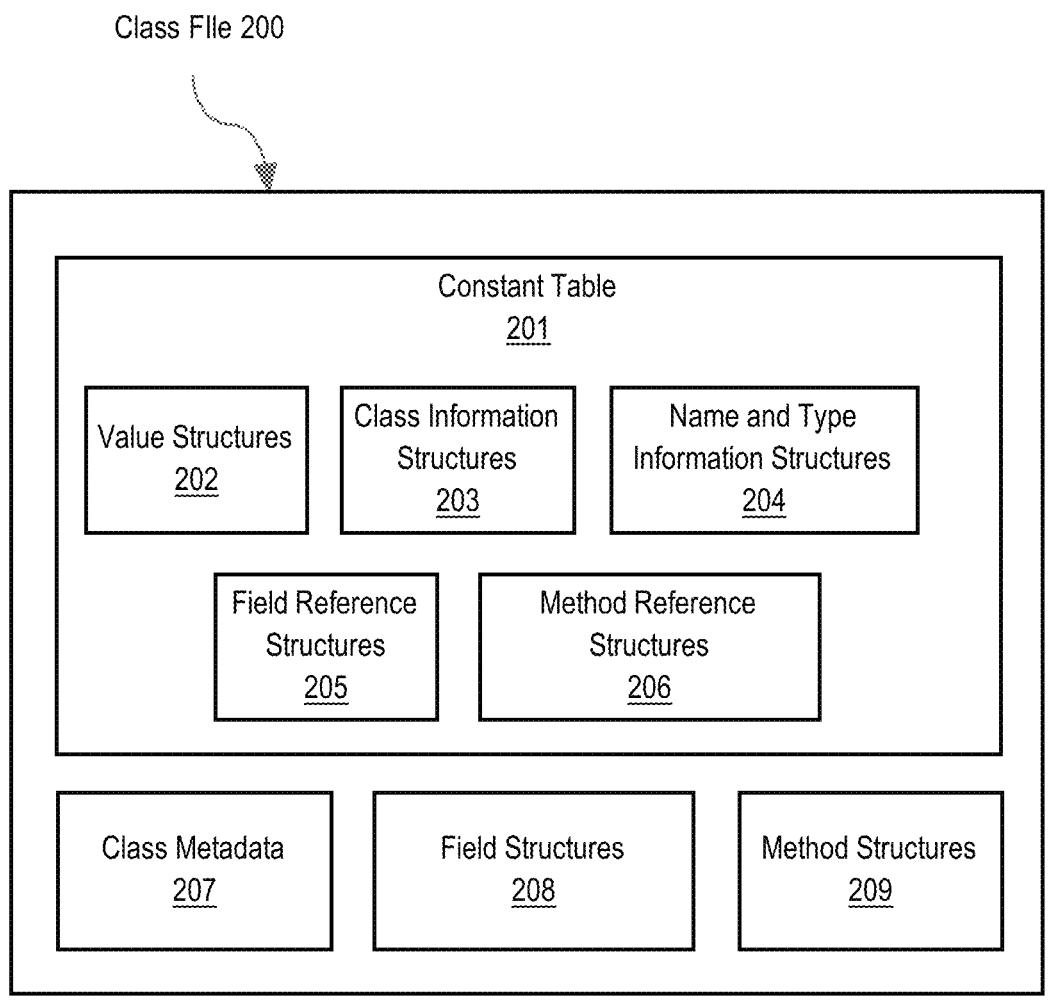
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I D)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
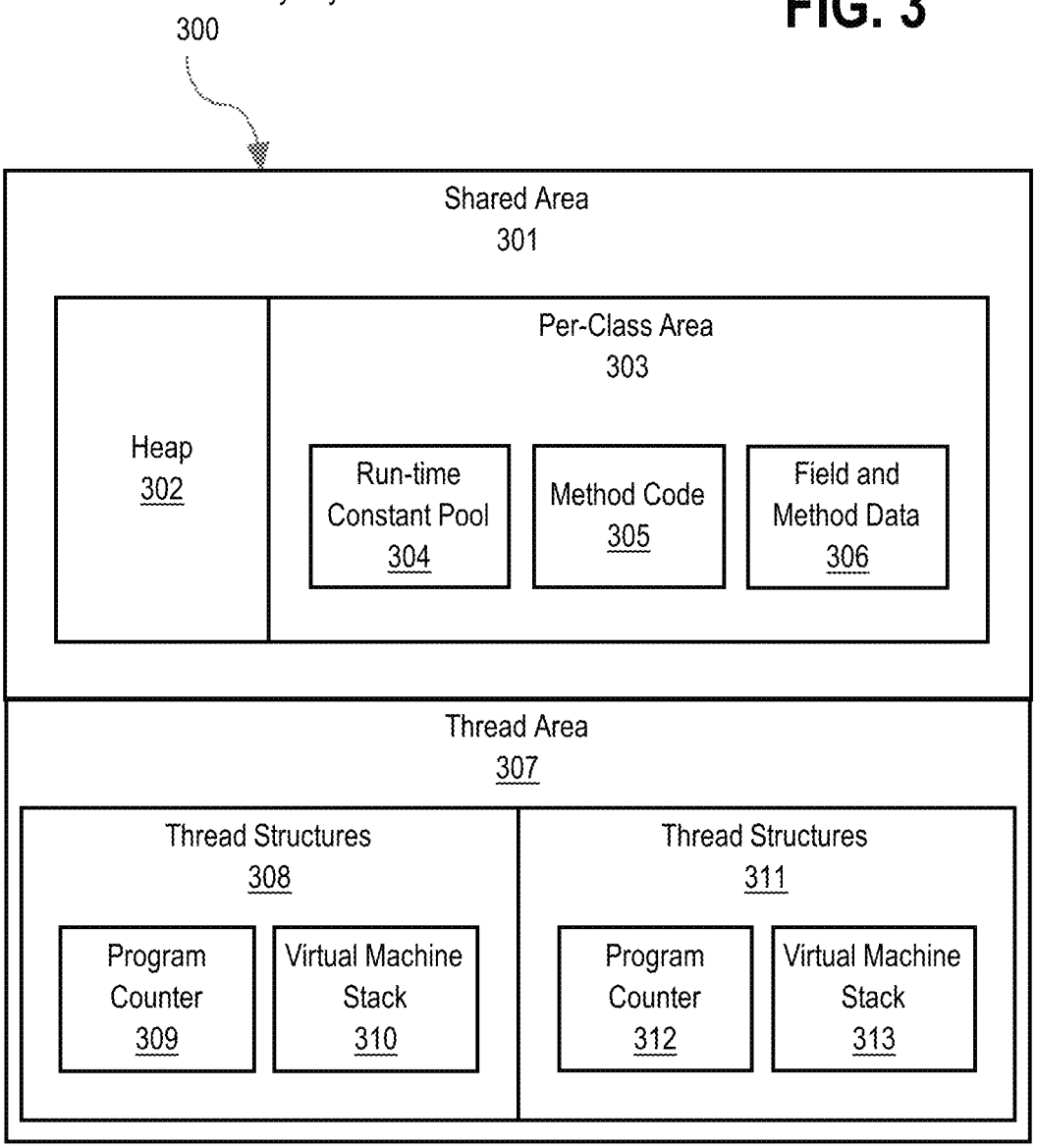
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
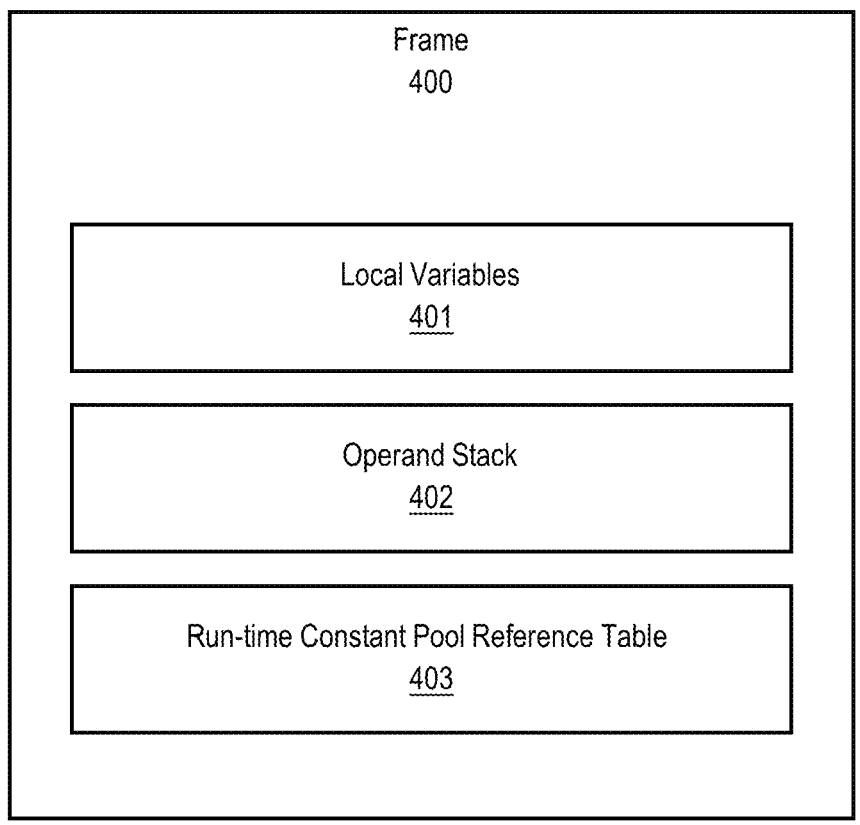
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Services

In one or more embodiments, a "service interface" includes one or more types that define a set of fields and/or method signatures. A method signature includes (a) a name of the method, and (b) parameters to the method. The service interface itself may but does not necessarily provide any implementation of methods.

In one or more embodiments, a "service implementation" includes one or more types that implement a service interface. The service implementation defines methods associated with the method signatures declared in the service interface. There may be more than one service implementation available for the same service interface. The service implementations available for a particular service interface are found during runtime. The process of finding service implementations available for a particular service interface may be referred to as "service binding." At runtime, one of multiple service implementations that are available for a particular service interface is selected to implement the particular service interface.

In one or more embodiments, a "service consumer" is a type that employs a service interface. The service consumer employs the service interface by invoking a lookup procedure that obtains one or more service implementations of the service interface. The service consumer declares a reference of the type of the service interface, rather than a reference of the type of the service implementation. In fact, the service consumer may be unaware of the service implementations available for the service interface at the time of coding and/or compilation. The service consumer uses the reference of the type of the service interface to access a field and/or call a method declared in the service interface. At runtime, the service implementation that has been selected to implement the service interface defines the method that is invoked by the service consumer.

In one or more embodiments, services may be used in a non-module environment and/or a module environment. In a module environment, each of the service interface, the service implementation(s), and the service consumer are included in a respective module. The service interface and a service consumer thereof may but are not necessarily included in the same module. Service implementations of different service interfaces may but are not necessarily included in the same module. Further descriptions regarding modules are included below in Section 4, entitled "Modules."

4. Modules

4.1 Module Declarations

In one or more embodiments, a named explicit module is a self-describing collection of code and/or data. (Other types of modules, such as unnamed modules and named automatic modules, may also exist in a module system.) The code is organized as a set of one or more packages (also referred to herein as "libraries"). Each package includes one or more types (such as classes and interfaces). A particular module's self-description is expressed in the particular module's module declaration. The particular module's self-description explicitly indicates one or more of the following:
 (a) the name (or other reference) of the particular module;
 (b) one or more other modules on which the particular module depends (module dependencies are further described below in Section 4.2, entitled "Module Dependencies");
 (c) one or more packages of the particular module that are exported to other modules (exportation and accessibility are further described below in Section 4.5, entitled "Access Control");
 (d) one or more service interfaces that are used by the particular module (service dependencies are further described below in Section 4.3, entitled "Service Dependencies"); and
 (e) one or more service interfaces for which the particular module provides an implementation (service dependencies are further described below in Section 4.3, entitled "Service Dependencies").

4.2 Module Dependencies

In one or more embodiments, a module dependency is a dependency indicated by a first module on a second module, whereby the second module must be present in order for the first module to be compiled and/or executed. For example, if a type associated with Module A references a type associated with Module B, then Module A must indicate a module dependency on Module B in order to be compiled and executed.

The declaration of a named explicit module indicates the module dependencies of the named explicit module by using, for example, a requires clause. For example, the declaration of Module A may use, "requires B," to indicate a module dependency on Module B.

Module dependencies (as well as service dependencies, discussed below) may be illustrated in a module graph. In a module graph, each module is represented by a node. A dependency between a first module and a second module is represented by an edge between a node representing the first module and a node representing the second module. The edge may also be labeled with the type of the corresponding dependency.

Figure 5A:
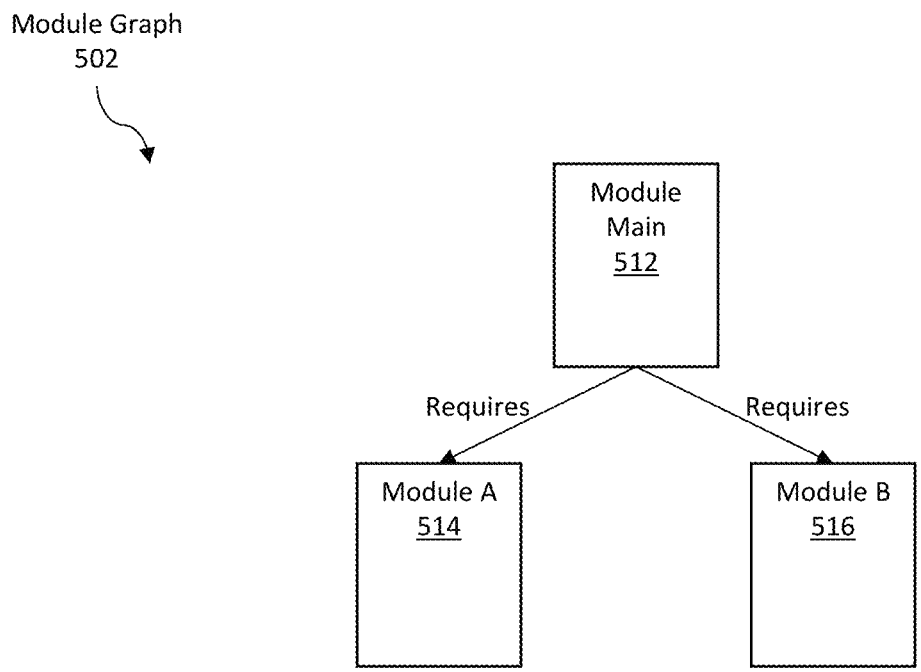
FIGS. 5A-E illustrate examples of module graphs, in accordance with one or more embodiments.

FIG. 5A illustrates an example of a module graph, in accordance with one or more embodiments. A module graph 502 illustrates module dependencies corresponding to Module Main 512. Module Main 512 is used as an initial module for the module graph 502. Module Main 512 includes a type that includes a method that serves as an application's entry point. In Java, for example, the default entry point method is called main. In other examples, a module graph may be determined using another module as an initial module. For example, a module that is required by Module Main 512 may be used as an initial module for a module graph. Examples described herein related to Module Main 512 may be equally applicable to any other module. Module Main 512 is referred to herein for purposes of explanation.

In this example, Module Main 512 is associated with the following module declaration:

```
module Main {
    requires A;
    requires B;
}
```

Module Main 512 is drawn as an initial node in the module graph 502. Since module graph 502 illustrates only module dependencies, only requires clauses are analyzed. Based on the requires clauses of Module Main 512, an edge is drawn from Module Main 512 to Module A 514. Additionally, an edge is drawn from Module Main 512 to Module B 516. Each edge is labeled "Requires," and points away from Module Main 512. The module graph 502 indicates that there is a module dependency from Module Main 512 to each of Module A 514 and Module B 516.

The module graph 502 may be expanded by recursively examining each module already identified in the module graph 502. The module declaration of Module A 514 may be examined. Based on the requires clauses of Module A 514, further nodes and edges stemming from the node representing Module A 514 may be added to the module graph 502. Similarly, the module declaration of Module B 516 may be examined. Based on the requires clauses of Module B 516, further nodes and edges stemming from the node representing Module B 516 may be added to the module graph 502.

The term "transitive closure of module dependencies" corresponding to Module Main 512 includes all module dependencies that may be identified by recursively examining each module already identified in the module graph 502. The term "a set of modules in the transitive closure of module dependencies" corresponding to Module Main 512 refers to all modules that may be identified by recursively examining each module already identified in the module graph 502 (excluding Module Main 512 itself). The set of modules in the transitive closure of module dependencies corresponding to Module Main 512 includes all modules represented in the module graph 502, except Module Main 512, after the expansion of the module graph 502 is complete.

As described in the above example, Module Main 512 requires Module A 514 and Module B 516. Continuing the example, Module A 514 may require Module C and Module D (not illustrated). Each of Module C and Module D do not require any other modules. Module B may require Module E (not illustrated). Module E does not require any other modules. Then a set of modules in the transitive closure of module dependencies corresponding to Module Main 512 is: Module A 514, Module B 516, Module C, Module D, and Module E.

4.3 Service Dependencies

In one or more embodiments, a service dependency is a dependency from a particular module to a set of one or more modules in which the particular module indicates that it uses a service interface and each of the set of modules indicates that it provides the service interface. The particular module may be referred to as a "service consumer module" or "consumer module." The set of modules may be referred to as "service provider modules." A service dependency includes the following relationships: (a) the use of the service interface by the service consumer module and (b) the provision of the service interface by each of the service provider modules.

The declaration of a named explicit module indicates the named explicit module's provision of a service interface by using, for example, a provides clause. For example, the declaration of Module A may use, "provides I," to indicate the presence of one or more types, which are carried within Module A, for the purpose of implementing the service interface I. As another example, the declaration of Module A may use, "provides I with C," to indicate the presence of a specific type C, which is carried within Module A, for the purpose of implementing the service interface I.

The declaration of a named explicit module indicates the named explicit module's use of a service interface by using, for example, a uses clause. For example, the declaration of Module B may use, "uses I," to indicate the presence of one or more types, which are carried within Module B, that reference the service interface I.

Figure 5B:
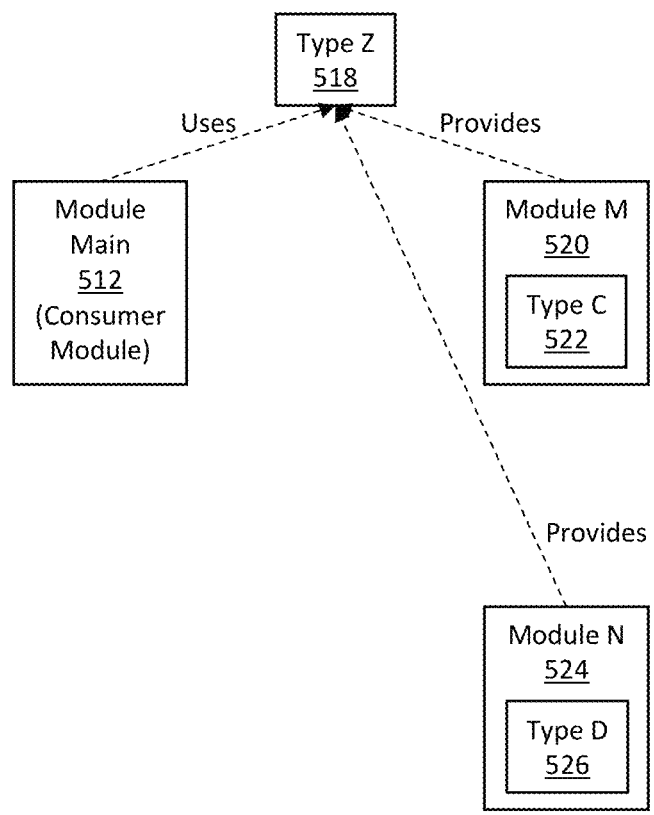

FIG. 5B illustrates an example of a module graph, in accordance with one or more embodiments. A module graph 504 illustrates service dependencies corresponding to Module Main 512. Since service binding occurs at runtime, the module graph 504 is determined during runtime. Module Main 512 is used as an initial module for the module graph 502. As described above, in other examples, a module graph may be determined using another module as an initial module.

In this example, Module Main 512 is associated with the following module declaration:

```
module Main {
    requires A;
    uses Z;
}
```

Module Main 512 is drawn as an initial node in the module graph 502. Since module graph 504 illustrates only service dependencies, only uses and provides . . . with clauses are analyzed. Based on the uses clauses of Module Main 512, an edge is drawn from Module Main 512 to Type Z 518. The edge is labeled "Uses," and points away from Module Main 512.

Additionally, Module M 520 and Module N 524 are associated with the following module declarations, respectively:

```
module M {
    requires A;
    provides Z with C;
}
module M {
    requires A;
    provides Z with D;
}
```

Based on the provides . . . with clause of Module M 520, an edge is drawn from Module M 520 to Type Z 518. Further, Module M 520 includes Type C 522. Based on the provides . . . with clause of Module N 524, an edge is drawn from Module N 524 to Type Z 518. Further, Module N 524 includes Type D 526.

Module Main 512 may be referred to as a "service consumer module" or "consumer module." Module M 520 and Module N 524 may each be referred to as a "service provider module." Module M 520 and Module N 524 together may be referred to as a "candidate set of service provider modules" for the service interface Type Z 518. The module graph 504 indicates there is a service dependency from Module Main 512 to Module M 520 and Module N 524, in which Module Main 512 uses the service interface Type Z 518, which is provided by each of Module M 520 and Module N 524. The service dependency includes the following relationships: (a) the use of the service interface Type Z 518 by the Module Main 512 and (b) the provision of the service interface Type Z 518 by each of Module M 520 and Module N 524.

It may be noted that Type Z 518 may be included in a module. Type Z 518 may be included in Module Main 512 or another module, such as Module A (not illustrated). If Type Z 518 is included in Module A, then Module Main 512 must declare a module dependency on Module A in order to use Type Z 518 as a service interface. Hence, in the example above, the module declaration of Module Main 512 includes a requires clause, indicating that Module Main 512 depends on Module A. Similarly, each of Module M 520 and Module N 524 must declare a module dependency on Module A in order to provide Type Z 518. Hence, in the example above, the module declarations of Module M 520 and Module N 524 each includes a requires clause, indicating that Module M 520 and Module N 524 each depends on Module A. Additionally, Module A must indicate an exportation of Type Z 518, in order for Type Z 518 to be accessed by other modules. The module declaration of Module A includes an exports clause, indicating that Type Z 518 is exported. Exportation is further discussed below with reference to Section 4.5, entitled "Access Control."

The module graph 504 may be expanded by recursively examining each module already identified in the module graph 504. The module declaration of Module M 520 may be examined. Based on the uses clauses of Module M 520, further nodes and edges stemming from the node representing Module M 520 may be added to the module graph 504. Similarly, the module declaration of Module N 524 may be examined. Based on the uses clauses of Module N 524, further nodes and edges stemming from the node representing Module N 524 may be added to the module graph 504.

The term "transitive closure of service dependencies" corresponding to Module Main 512 includes all service dependencies that may be identified by recursively examining each module already identified in the module graph 504. The term "a set of service interfaces in the transitive closure of service dependencies" corresponding to Module Main 512 refers to all service interfaces that may be identified by recursively examining each module already identified in the module graph 504. The set of service interfaces in the transitive closure of module dependencies corresponding to Module Main 512 includes all service interfaces represented in the module graph 504, after the expansion of the module graph 504 is complete. The term "a set of service provider modules in the transitive closure of service dependencies" corresponding to Module Main 512 refers to all service provider modules that may be identified by recursively examining each module already identified in the module graph 504 (excluding Module Main 512 itself, even if Module Main 512 is a service provider module). The set of service provider modules in the transitive closure of module dependencies corresponding to Module Main 512 includes all service provider modules represented in the module graph 504, except Module Main 512, after expansion of the module graph 504 is complete.

As described in the above example, Module Main 512 uses Type Z 518, which is provided by Module M 520 and Module N 524. Continuing the example, Module M 514 may use Type I (not illustrated), which is provided by Module P (not illustrated). Module P may use Type J (not illustrated), which is provided by Module R (not illustrated). Module R does not use any other service interfaces. Module N does not use any other service interfaces. Then a set of service provider modules in the transitive closure of service dependencies corresponding to Module Main 512 is: Module M 520, Module N 524, Module P, and Module R.

4.4 Module Graph Examples

Figure 5C:
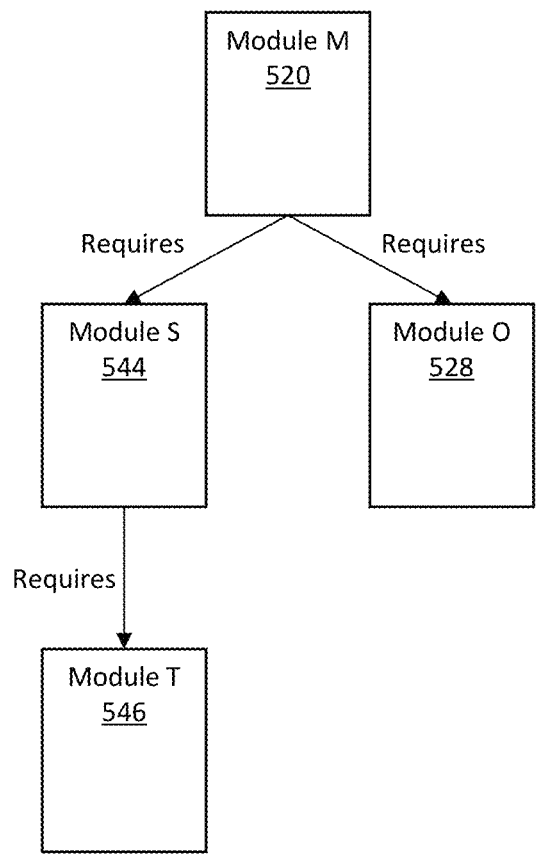
Figure 5D:
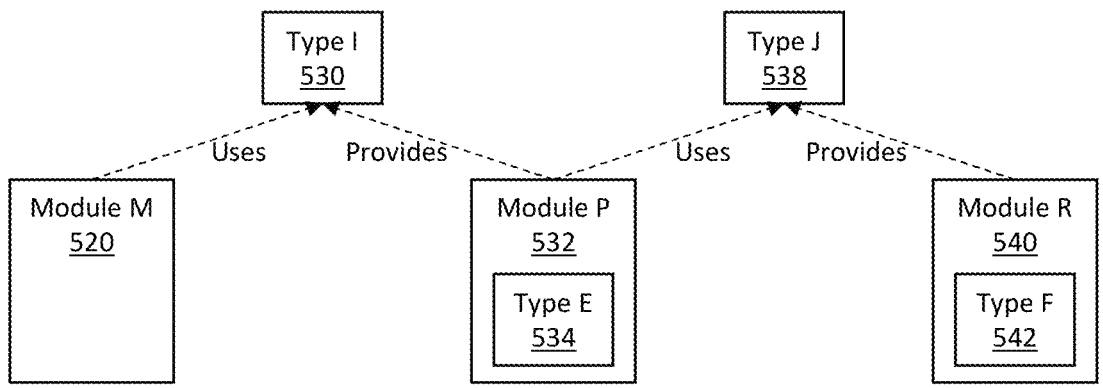
Figure 5E:
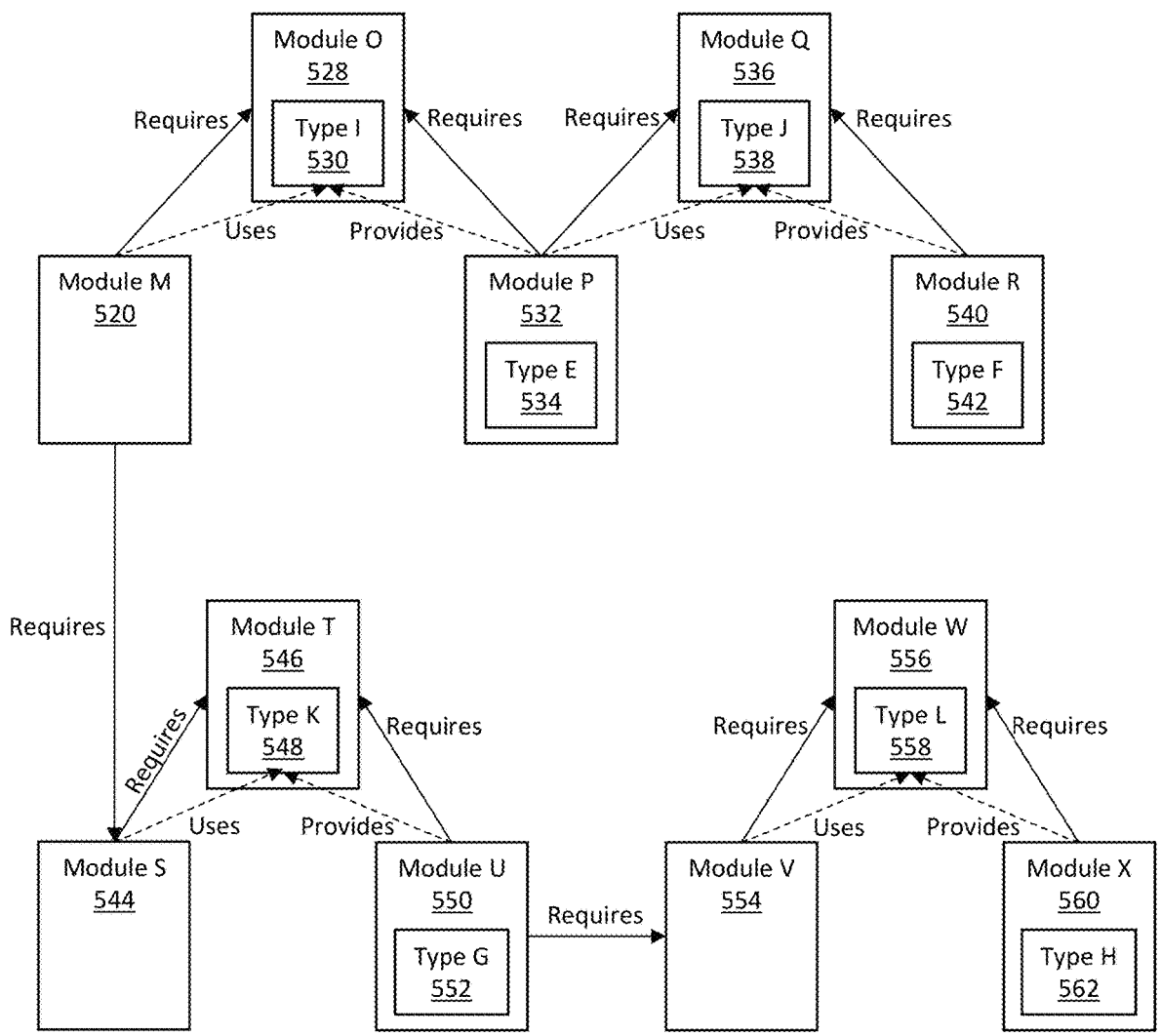

FIGS. 5C-E illustrate examples of module graphs corresponding to a same set of modules, in accordance with one or more embodiments. A module graph may be represented graphically, as drawn in FIG. 5C-E. Additionally or alternatively, a module graph may be represented textually and/or using a set of data structures (such as a list, a table, or an array). A module graph may be traversed using a breadth-first or a depth-first approach.

FIG. 5C illustrates a module graph 506 of module dependencies corresponding to the set of modules. FIG. 5D illustrates a module graph 508 of service dependencies corresponding to the set of modules. FIG. 5E illustrates a module graph 510 of both module dependencies and service dependencies corresponding to the set of modules. An initial node of each of module graph 506, module graph 508, and module graph 510 represents Module M 520.

Referring to the example described above with reference to FIG. 5B, Module M 520 is in the candidate set of service provider modules for Type Z 518. Hence, in an example, each of module graph 506, module graph 508, and module graph 510 illustrates module dependencies and/or service dependencies corresponding to a service provider module for Type Z 518.

Referring to FIG. 5C, initially, modules that are directly depended upon by Module M 520 are identified. Modules directly depended upon by Module M 520 are: Module O 528 and Module S 544.

Next, modules directly depended upon by each identified module are recursively traversed. At this time, the identified modules that have not yet been traversed are: Module S 544 and Module O 528. Module S 544 is traversed, to determine that Module S 544 depends on Module T 546. Module O 528 is traversed, to determine that Module O 528 does not depend on any other modules.

At this time, the identified modules that have not yet been traversed are: Module T 546. Module T 546 is traversed, to determine that Module T 546 does not depend on any other modules. Hence, all identified modules have been traversed.

Referring to FIG. 5D, initially, modules that provide a service interface directly used by Module M 520 are identified. Service interfaces directly used by Module M 520 are: Type I 530. Modules that provide a service interface (that is, Type I 530) directly used by Module M 520 are: Module P 532. Module P 532 provides Type I 530 with Type E 534.

Next, modules that provide a service interface directly used by each identified module are recursively traversed. At this time, the identified modules that have not yet been traversed are: Module P 532. Module P 532 is traversed, to determine that service interfaces directly used by Module P 532 are: Type J 538. Modules that provide a service interface (that is, Type J 538) directly used by Module P 534 are: Module R 540. Module R 540 provides Type J 538 with Type F 542.

At this time, the identified modules that have not yet been traversed are: Module R 540. Module R 540 is traversed, to determine that Module R 540 does not use any other service interfaces. Hence, all identified modules have been traversed.

Referring to FIG. 5E, modules that are directly depended upon by Module M 520, and modules that provide a service interface directly used by Module M 520 are identified. Modules directly depended upon by Module M 520 are: Module O 528 and Module S 544. Additionally, modules that provide a service interface (that is, Type I 530) directly used by Module M 520 are: Module P 532. Module P 532 provides Type I 530 with Type E 534. As illustrated, Module O 528 includes Type I 530.

Next, modules directly depended upon by each identified module, and modules that provide a service interface directly used by each identified module are recursively traversed. As illustrated, Module P 532 requires Module Q 536 and uses Type J 538. Module Q 536 includes Type J 538. Module R 540 requires Module Q 536 and provides Type J 538 with Type F 542. Module R 540 does not require any other modules or use any service interfaces.

Also as illustrated, Module S 544 requires Module T 546 and uses Type K 548. Module T 546 includes Type K 548. Module U 550 requires Module T 546 and provides Type K 548 with Type G 552. Module U 550 does not use any service interfaces, but requires Module V 554. Module V requires Module W 556 and uses Type L 558. Module W 556 includes Type L 558. Module X 560 requires Module W 556 and provides Type L 558 with Type H 562. Module X 560 does not require any other modules or use any service interfaces.

4.5 Access Control

In one or more embodiments, there are at least three aspects to access control: observability, readability, and accessibility. Further descriptions of access control and/or encapsulation boundaries are included in U.S. patent application Ser. No. 14/847,800, filed Sep. 8, 2015, and U.S. patent application Ser. No. 14/847,833, filed Sep. 8, 2015; each of which is incorporated by reference in its entirety.

4.5.1 Observability

In one or more embodiments, a module is "observable" if a compiler or virtual machine (such as, JVM) is able to find the module. Observable modules include, for example, (1) named modules built into the compile-time environment and/or runtime environment 113 (which may be stored in a runtime image), and (2) named modules included in modular artifacts associated with a particular repository (such as, a module path). (Observable modules may also include, for example, an unnamed module associated with another repository (such as, a class path).) Types that are within packages of observable modules are referred to herein as "observable types."

In an embodiment, a repository is a location (such as, a URL) that includes one or more class files. Different class loaders may load types from different repositories. Examples of repositories include a module path and a class path.

A module path is an ordered list of entries that is defined by a host system. Each entry identifies a location (such as, a URL) of one or more modular artifacts and/or directories including modular artifacts. As an example, a module path for a particular class loader may be defined in a -modulepath statement in a command line.

A modular artifact includes class files of the types associated with the packages of a particular module. The modular artifact also includes the module declaration of the particular module. The modular artifact may be a compressed version of the contents. Various formats may be used to store a modular artifact, including but not limited to a Java Archive (JAR) file format, ZIP file format, and JMOD file format. A modular artifact may also be referred to herein as a "module source."

A class path is an ordered list of entries defined by a host system. Each entry identifies a location (such as, a URL) of one or more types, directories including types, and/or artifacts including types. As an example, a class path for a particular class loader may be defined in a -cp statement or -classpath statement in a command line, and/or a CLASS-PATH environment variable of a development toolkit.

The modules that are observable within a particular repository may be modified by a host system. For example, the modules that are observable from a module path may be modified by a -limitmods statement in a command line. The command line may be used to remove specific modules that are found in the module path from the set of observable modules. As an example, limiting the observable modules may be useful for debugging. As another example, limiting the observable modules reduces the number of modules resolved when the main module is the unnamed module defined by the application class loader for the application class path.

4.5.2 Readability

In one or more embodiments, a first named explicit module is "readable" to a second named explicit module if the second named explicit module explicitly depends on the first named explicit module. Given an initial observable module with one or more explicit dependencies, the runtime environment 113 performs resolution to determine a module graph of the module dependencies and/or a transitive closure of the module dependencies. During resolution, the runtime environment 113 locates a first set of observable modules to fulfill the explicit dependencies of the initial observable module. The runtime environment 113 locates a second set of observable modules to fulfill the dependencies of the first set of modules. The runtime environment 113 recursively fulfills the dependencies of all observable modules already identified in the module graph. The module graph and the transitive closure of module dependencies are further described above in Section 4.2, entitled "Module Dependencies."

4.5.3 Accessibility

In one or more embodiments, a first type of a first named explicit module is "accessible" to a second type of a second named explicit module if (1) the second named explicit module explicitly depends on the first named explicit module, and (2) the first named explicit module explicitly exports the package including the first type. (An additional requirement for accessibility may be that the first type is declared as being public.)

The runtime environment 113 may strictly enforce the accessibility of types. A particular type is not allowed to access another type that is not accessible to the particular type. If a type of one module references another type of another module that is not accessible, then the runtime environment 113 causes an error to be thrown.

A named explicit module explicitly indicates the named explicit module's exportations. A module declaration may indicate an exportation using, for example, an exports clause. The exports clause may identify one or more packages of the particular module that are exported to other modules. As an example, a module declaration of Module A (which includes Package P) may include, "exports Package P," to indicate that types within Package P may be accessible to other modules.

5. A Service Implementation Selection System

Figure 6:
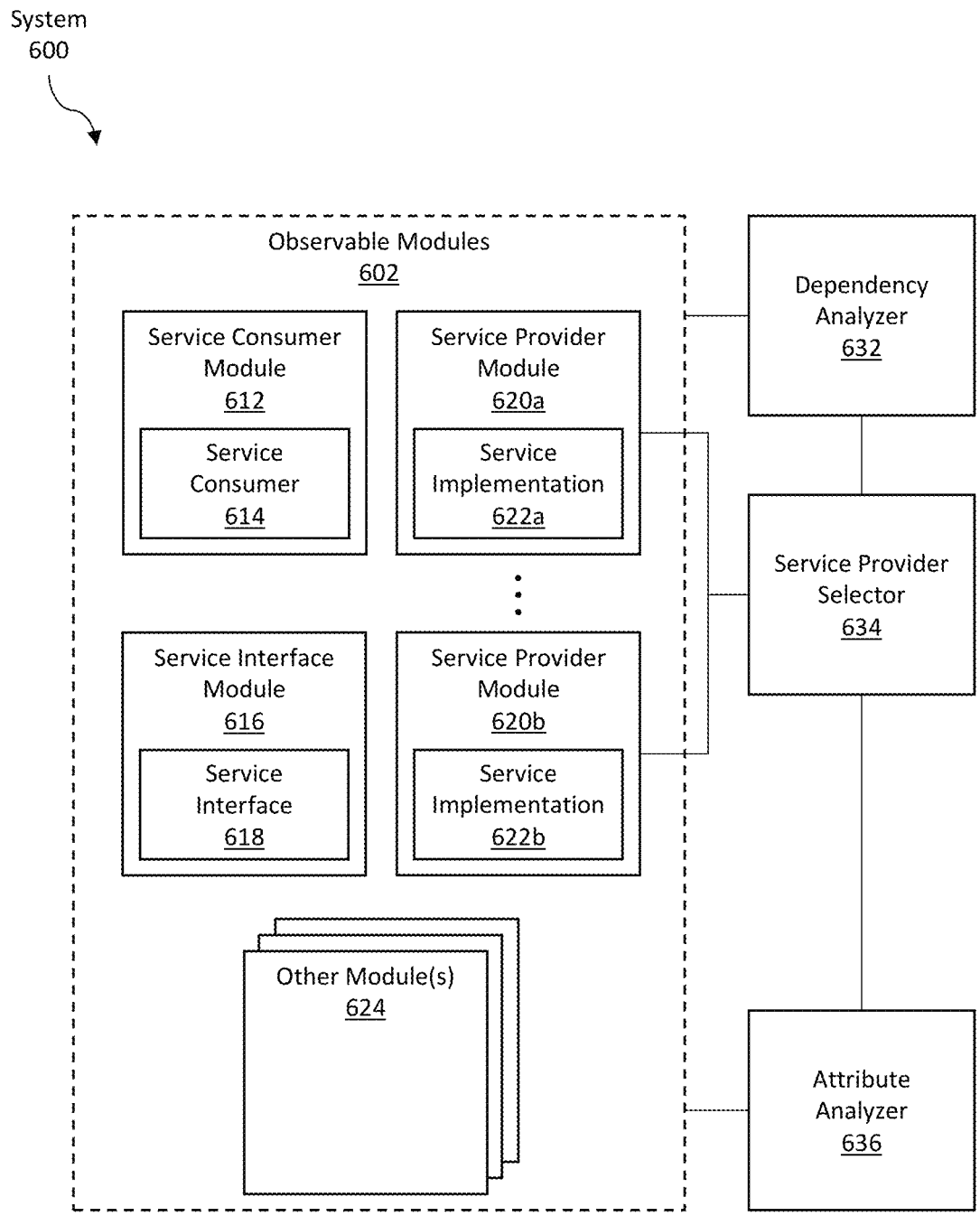
FIG. 6 illustrates an example of a service implementation selection system, in accordance with one or more embodiments.

FIG. 6 illustrates an example of a service implementation selection system, in accordance with one or more embodiments. As illustrated in FIG. 6, a system 600 includes observables modules 602, a dependency analyzer 632, a service provider selector 634, and an attribute analyzer 636. In one or more embodiments, the system 600 may include more or fewer components than the components illustrated in FIG. 6. The components illustrated in FIG. 6 may be local to or remote from each other. The components illustrated in FIG. 6 may be implemented in software and/or hardware. Each component may be distributed over multiple applications and/or machines. Multiple components may be combined into one application and/or machine. Operations described with respect to one component may instead be performed by another component.

In one or more embodiments, observable modules 602 are a set of modules that a runtime environment 113 is able to find. As described above in Section 4.5.1, entitled "Observability," observable modules include, for example, (1) named modules built into the compile-time environment and/or runtime environment 113 (which may be stored in a runtime image), (2) named modules included in modular artifacts on a module path, and (3) an unnamed module on a class path.

Observable modules 602 include a service consumer module 612, a service interface module 616, service provider modules 620a-b, and/or other modules 624. The service consumer module 612 includes a type that is a service consumer 614. The service consumer 614 may be but is not necessarily an entry point for an application. The service consumer 614 may be but is not necessarily an initial type that is executed by a runtime environment 113. A service interface module includes a type that is a service interface 618. A service provider module (such as service provider module 620a or service provider module 620b) includes a type that is a service implementation (such as service implementation 622a or service implementation 622b). Other modules 624 may include (a) modules that are depended upon by the service consumer module 612, the service provider module 620a, the service provider module 620b, and/or any other observable module; (b) modules that provide a service interface used by the service provider module 620a, the service provider module 620b, and/or any other observable module; and/or (c) modules that export a service interface used by the service provider module 620a, the service provider module 620b, and/or any other observable module.

In an example, the service consumer 614 references the service interface 618. The service consumer 614 may include a declaration of a variable that is of the type of the service interface 618. The variable may be a reference or pointer that points to either a null object or an object of a type that implements the service interface. Additionally or alternatively, the service consumer 614 may include instructions to obtain one or more instances of service implementations 622a-b for the service interface 618. Additionally or alternatively, the service consumer 614 may include instructions to execute a method of the service interface 618. Since the service consumer 614 references the service interface 618 and is included in the service consumer module 612, the service consumer module 612 may be said to "use" the service interface 618. The service consumer module 612 is associated with a module declaration that explicitly indicates the use of the service interface 618.

Continuing the example, each of the service implementation 622a and service implementation 622b implements the service interface 618. Each of the service implementation 622a and service implementation 622b provide declarations and/or method bodies for method signatures defined in the service interface 618. Since the service implementation 622a implements the service interface 618 and is included in the service provider module 620a, the service provider module 620a may be said to "provide" the service interface 618. Similarly, the service provider module 620b may be said to "provide" the service interface 618. Each of the service provider module 620a and service provider module 620b is associated with a respective module declaration that explicitly indicates the provision of the service interface 618.

Continuing the example, as described above, the service interface module 616 includes the service interface 618. In order to make the service interface 618 available to other modules, the service interface module 616 is associated with a module declaration that explicitly indicates an exportation of the service interface 618. Additionally, since the service consumer module 612 and the service provider modules 620a-b each include a type that refers to the service interface 618, each of them explicitly indicates a module dependency on the service interface module 616.

In one or more embodiments, one or more observable modules 602 may be stored in a data repository (not illustrated). A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as a dependency analyzer 632, service provider selector 634, and/or attribute analyzer 636. Alternatively or additionally, a data repository may be implemented or executed on a computing system separate from a dependency analyzer 632, service provider selector 634, and/or attribute analyzer 636. A data repository may be communicatively coupled to the dependency analyzer 632, service provider selector 634, and/or attribute analyzer 636 via a direct connection or via a network.

In one or more embodiments, a dependency analyzer 632 refers to hardware and/or software configured to determine module dependencies and/or service dependencies associated with one or more observable modules 602. As an example, the dependency analyzer 632 may determine a module graph of module dependencies and/or service dependencies corresponding to each of the service provider modules 620a-b. As another example, the dependency analyzer 632 may determine a transitive closure of module dependencies and/or service dependencies corresponding to each of the service provider modules 620a-b. Module dependencies and/or service dependencies are described above in Section 4.2, entitled "Module Dependencies"; Section 4.3, entitled "Service Dependencies"; and Section 4.4, entitled "Module Graph Example."

In one or more embodiments, an attribute analyzer 636 is configured to analyze one or more attributes associated with one or more observable modules 602. The attributes may be related to modular information, statically-available information, and/or dynamically-available information associated with an observable module 602.

Modular information may include: (a) an attribute associated with a set of modules in a transitive closure of the module dependencies corresponding to each service provider module that provides for the service interface 618 (such as the service provider module 620a and service provider module 620b); and/or (b) an attribute associated with a set of modules in a transitive closure of the service dependencies corresponding to each service provider module that provides for the service interface 618 (such as the service provider module 620a and service provider module 620b). Specific examples of attributes associated with the service provider module 620a include but are not limited to the attributes described below.

Examples of attributes associated with module dependencies corresponding to the service provider module 620a include:
(a) a number of modules directly depended upon by the service provider module 620a;
(b) a number of modules directly or indirectly depended upon by the service provider module 620a; and
(c) a number of modules indirectly depended upon by the service provider module 620a.

Examples of attributes associated with service dependencies corresponding to the service provider module 620a, and in particular the service interfaces associated with the service dependencies include:
(a) a number of service interfaces directly used by the service provider module 620a; and (b) a number of service interfaces in a transitive closure of the service dependencies corresponding to the service provider module 620*a*; and (c) a minimum number of service interfaces that may be directly or indirectly used by the service provider module 620*a*.

Examples of attributes associated with service dependencies corresponding to the service provider module 620*a*, and in particular the service provider modules associated with the service dependencies include:

(a) a number of service provider modules that provide a service interface directly used by the service provider module 620*a*; and (b) a number of service provider modules in a transitive closure of the service dependencies corresponding to the service provider module 620*a*.

Examples of attributes associated with one or more service provider modules in a transitive closure of service dependencies corresponding to the service provider module 620*a* include:

(a) a number of modules directly depended upon by one or more service provider modules in a transitive closure of the service dependencies corresponding to the service provider module 620*a*;

(b) a number of modules directly or indirectly depended upon by one or more service provider modules in the transitive closure of the service dependencies corresponding to the service provider module 620*a*;

(c) a number of modules indirectly depended upon by one or more service provider modules in the transitive closure of the service dependencies corresponding to the service provider module 620*a*;

(d) a number of service interfaces directly used by one or more service provider modules in the transitive closure of the service dependencies corresponding to the service provider module 620*a*; and (e) a number of service provider modules that provide a service interface directly used by one or more service provider modules in the transitive closure of the service dependencies corresponding to the service provider module 620*a*.

Examples of attributes associated with both module dependencies and service dependencies corresponding to the service provider module 620*a* include: a number of modules in a module graph that (a) starts with the service provider module 620*a* as an initial node and (b) recursively traverses both module dependencies and service dependencies of the service provider module 620*a* and each module identified thereafter.

Examples of attributes directly associated with the service provider module 620*a* include:

(a) whether all service interfaces directly used by the service provider module 620*a* are able to be bound; and (b) whether the service provider module 620*a* exports a package or type for other modules to access.

Specific examples of statically-available information associated with the service provider module 620*a* include but are not limited to the attributes described below:

(a) a code footprint of a set of modules in a transitive closure of the module dependencies corresponding to the service provider module 620*a*, wherein the code footprint is measured by at least one of: (i) a number of types in the set of modules; (ii) a number of classes in the set of modules; (iii) a total number of code lines in the set of modules; and (iv) a memory space occupied by the set of modules; and (b) attributes associated with computational constructs in the set of modules, such as (i) an average number of code lines per method in the set of modules; (ii) a total number of code lines comprising a decision logic in the set of modules; (iii) an average number of code lines comprising a decision logic per method in the set of modules; (iv) a total number of loops in the set of modules; (v) an average number of loops per method in the set of modules; and (vi) an average number of parameters per method in the set of modules.

Specific examples of dynamically-available information associated with the service provider module 620*a* include but are not limited to the attributes described below:

(a) emulated or estimated memory footprint associated with selecting the service provider module 620*a*;

(b) emulated or estimated number of processor cycles associated with selecting the service provider module 620*a*; and (c) a number of objects that are (a) instantiated if the service provider module 620*a* is selected for the particular service interface and (b) configured to occupy a memory space above a particular threshold.

In one or more embodiments, a service provider selector 634 refers to hardware and/or software configured to select one of a candidate set of service provider modules 620*a-b* to provide a particular service interface 618. The selection is made based on the dependencies determined by the dependency analyzer 632 and/or the attributes determined by the attribute analyzer 636. Examples of operations for selecting a service provider module (and the service implementation(s) therein) to provide a service interface are described below with reference to FIG. 7. The selected service provider module defines the methods for the method signatures included in the service interface 618 for use by the service consumer module 612. The service consumer module 612 accesses the selected service provider module to execute the methods defined in the selected service provider module.

In an embodiment, a dependency analyzer 632, service provider selector 634, and/or attribute analyzer 636 are implemented within a runtime environment 113 of FIG. 1. Observable modules 602 include class files 103 that are input to the runtime environment 113.

In an embodiment, a dependency analyzer 632, service provider selector 634, and/or attribute analyzer 636 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, and/or a personal digital assistant (PDA).

In alternative embodiments, a set of code is not organized as modules. There is no modular information to be used for selecting a service implementation for a particular service interface. Alternatively, even though a set of code is organized as modules, the modular information associated with the modules is not used for selecting a service implementation for a particular service interface. The set of code includes a service consumer 614, a service interface 618, a candidate set of service implementations 622*a-b*, and/or other code. An attribute analyzer 626 analyzes the statically-available information and/or dynamically-available information associated with each of the candidate set of service implementations 622*a-b*. Based on the attributes, a service provider selector 634 selects one of a candidate set of service implementations 622*a-b* to implement the service interface

618. Examples of operations for selecting a service implementation to implement a service interface are described below with reference to FIG. 8.

Figure 7:
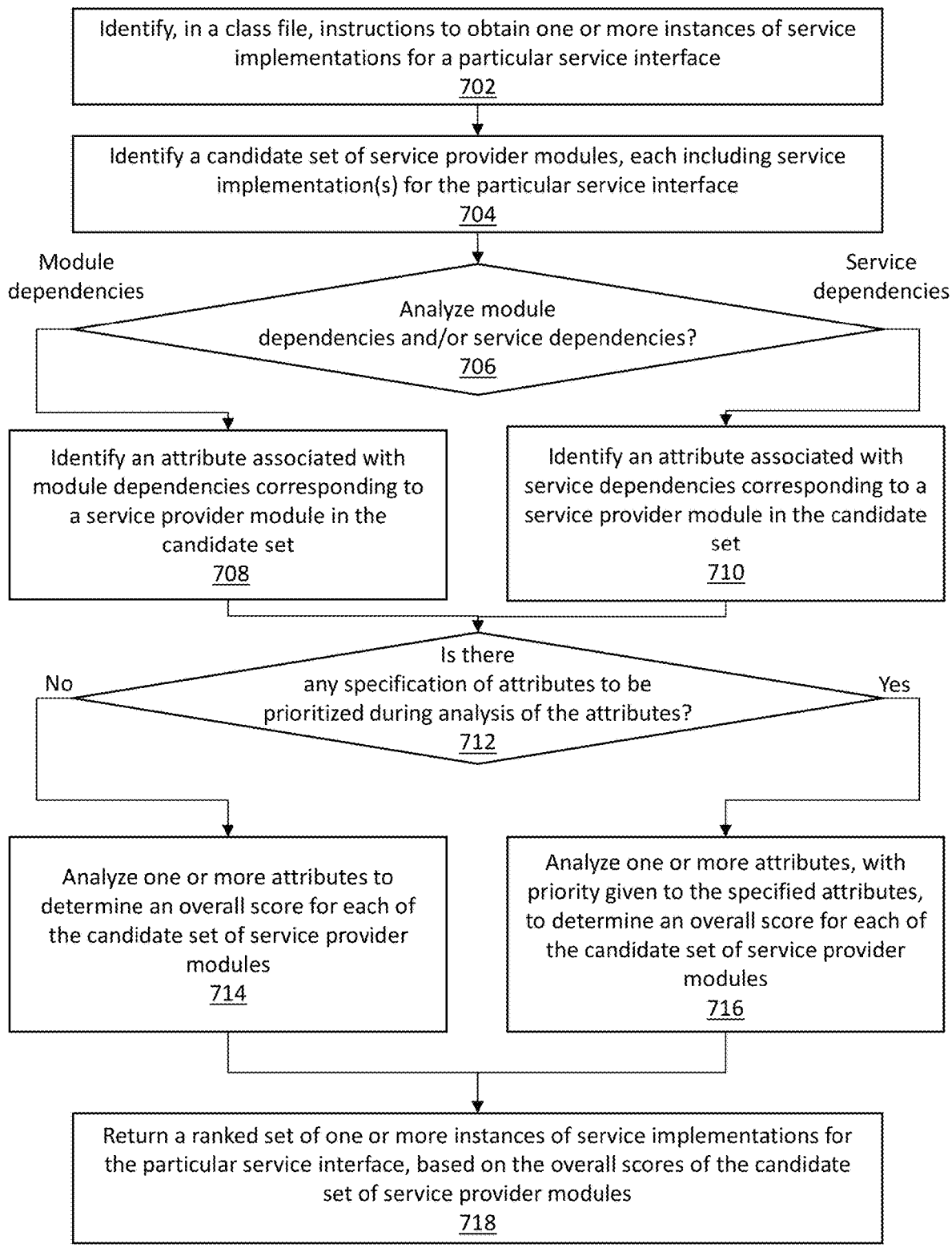
FIG. 7 illustrates an example set of operations for ranking service provider modules (which include one or more service implementations) for a particular service interface, in accordance with one or more embodiments.

6. Ranking Service Implementations for Implementing A Particular Service Interface Based on Modular Information FIG. 7 illustrates an example set of operations for ranking service provider modules (which include one or more service implementations) for a particular service interface, in accordance with one or more embodiments. FIG. 7 focuses on ranking service provider modules based on modular information. Modular information includes statically-available and/or dynamically-available information related to modules, module dependencies, and/or service dependencies. One or more operations illustrated in FIG. 7 may be modified, rearranged, or omitted all together. Accordingly, the particular sequence of operations illustrated in FIG. 7 should not be construed as limiting the scope of one or more embodiments.

6.1 Identifying a Candidate Set of Service Provider Modules

One or more embodiments include identifying instructions to obtain one or more instances of service implementations for a particular service interface (Operation 702). A runtime environment 113 loads a class file including a particular type. The particular type may include a method that serves as an application's entry point (such as a main method). Alternatively, the particular type may be directly or indirectly called by another type that serves as an application's entry point. The runtime environment 113 executes instructions within the particular type, including instructions to obtain one or more instances of service implementations for the particular service interface. Since the particular type uses the particular service interface, a module including the particular type may be referred to as a "service consumer module."

The instructions to obtain one or more instances of service implementations for a particular service interface may include instructions to execute a lookup procedure. In an example, instructions to obtain one or more instances of service implementations for the particular service interface may include: instructions to execute a method that searches through observable modules for service provider modules that provide the particular service interface, and to instantiate a set of objects whose respective type is that of a service implementation included in each service provider module. In this example, the set of objects are instantiated without any instructions explicitly identifying the names of any service implementations. The particular type being loaded does not necessarily identify any service implementations for the particular service interface by name.

One or more embodiments include identifying a candidate set of service provider modules, each including one or more service implementations for the particular service interface (Operation 704). Based on the instructions identified at Operation 702, the runtime environment 113 searches through the observable modules to identify service provider modules for the particular service interface. The runtime environment 113 analyzes the module declaration of each observable module to determine whether the module declaration states that the corresponding module provides the particular service interface. The provision of the particular service interface may be indicated by, for example, a provides clause of the module declaration.

Each service provider module includes one or more types that implement the particular service interface. As described above in Section 3, entitled "Services," a keyword, such as implements, may be associated with one or more types in order to indicate that the types implement the particular service interface. A type that implements the particular service interface may be referred to as a "service implementation" for the particular service interface.

6.2 Identifying Modular and Other Attributes

One or more embodiments include determining whether to analyze module dependencies and/or service dependencies (Operation 706). The runtime environment 113 determines whether to analyze module dependencies and/or service dependencies based on a configuration. In an embodiment, the configuration is set by the host system. The configuration may be set, for example, via a command line. In an embodiment, the configuration is set by the application that includes the instructions identified at Operation 702. As an example, the instructions to obtain instances of service implementations for the particular service interface, identified at Operation 702, may be associated with an indication of whether to analyze module dependencies and/or service dependencies. In an embodiment, a default configuration is stored as part of the runtime environment 113.

One or more embodiments include identifying an attribute associated with module dependencies corresponding to a service provider module in the candidate set (Operation 708). The runtime environment 113 determines one or more module graphs corresponding to a service provider module identified as part of the candidate set of service provider modules at Operation 704. Various methods for determining a module graph may be used, examples of which are further described below.

In an embodiment, the runtime environment 113 determines a module graph of the module dependencies and/or service dependencies prior to beginning execution of any code. The runtime environment 113 stores the module graph in a data repository. The runtime environment 113 retrieves and/or accesses the module graph when performing Operation 708. In an alternative embodiment, the runtime environment 113 determines a module graph of the module dependencies and/or service dependencies subsequent to performing Operation 702. As an example, the runtime environment 113 may determine the module graph as part of Operation 704 and/or Operation 708.

In an embodiment, the runtime environment 113 determines a single module graph that includes each of the candidate set of service provider modules identified at Operation 704. An initial node of the module graph may represent a module that serves as an application's entry point (such as a module that includes a main method). Alternatively, an initial node of the module graph may represent the service consumer module that uses the particular service interface identified at Operation 702. The module graph may include all, or only a subset of, module dependencies and/or service dependencies corresponding to each of the candidate set of service provider modules.

Figure 9:
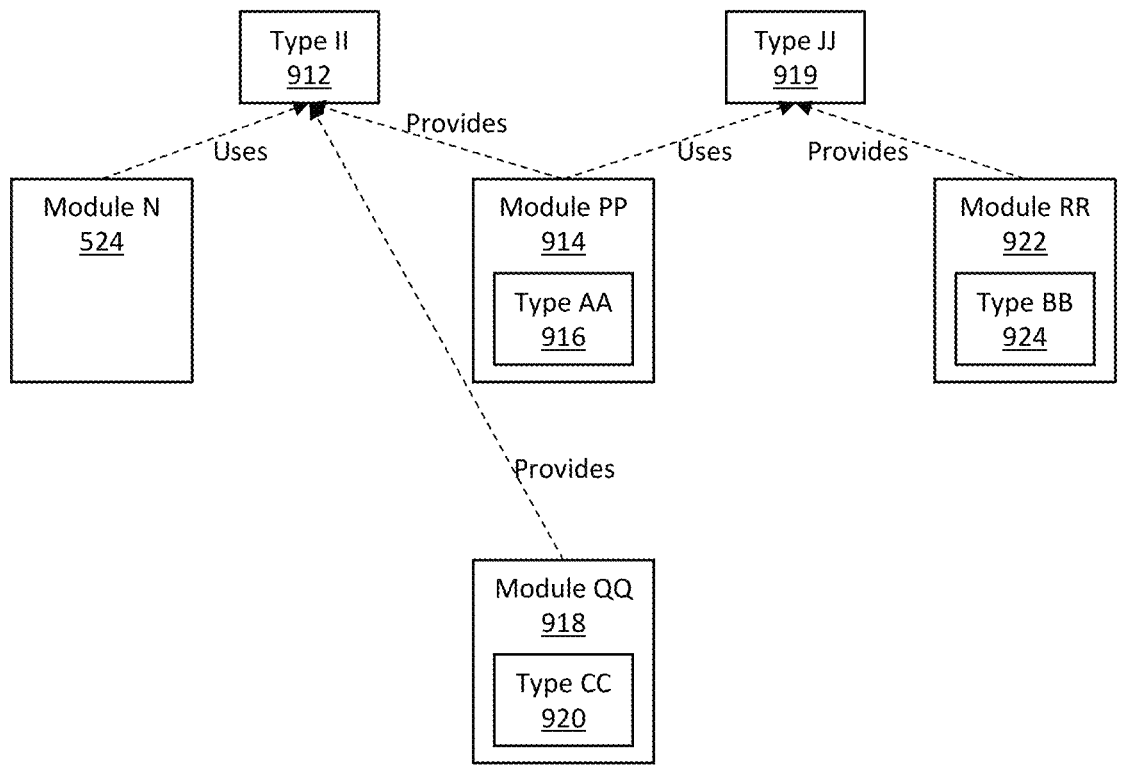
FIG. 9 illustrates an example of a module graph, in accordance with one or more embodiments.

In an alternative embodiment, the runtime environment 113 determines a separate module graph corresponding to each of the candidate set of service provider modules identified at Operation 704. An initial node of each module graph represents a respective service provider module. Each module graph includes all, or only a subset of, module dependencies and/or service dependencies corresponding to a respective service provider module. Referring to FIGS. 5A-E as an example, module graph 506, module graph 508, and module graph 510 may be module graphs corresponding to Module M 520, which may be a service provider module for Type Z 518. Referring to FIG. 9 as an example, the module graph 902 may be a module graph corresponding to Module N 524, which may be another service provider module for Type Z 518. Alternative and/or additional module graphs (not illustrated) may be determined for Module N 524.

The runtime environment 113 uses one or more module graphs to identify an attribute associated with module dependencies corresponding to a service provider module identified as part of the candidate set of service provider modules at Operation 704. Various methods for identifying an attribute may be used, examples of which are further described below.

In an example, a runtime environment 113 determines a number of modules directly depended upon by the service provider module identified at Operation 704. The runtime environment 113 may count the number of modules that are directly required by the service provider module, as indicated by a module graph. Referring to FIGS. 5B-C as an example, Module M 520 may be one of a candidate set of service provider modules for Type Z 518. The number of modules directly depended upon by Module M 520 is two (that is, Module S 544 and Module O 528).

In an example, a runtime environment 113 determines a number of modules directly or indirectly depended upon by the service provider module identified at Operation 704. The runtime environment 113 may count the number of modules that are directly or indirectly required by the service provider module, as indicated by a module graph. Referring to FIGS. 5B-C as an example, Module M 520 may be one of a candidate set of service provider modules for Type Z 518. The number of modules directly or indirectly depended upon by Module M 520 is three (that is, Module S 544, Module O 528, and Module T 546).

In an example, a runtime environment 113 determines a number of modules indirectly depended upon by the service provider module identified at Operation 704. The runtime environment 113 may count the number of modules that are indirectly required by the service provider module, as indicated by a module graph. Referring to FIGS. 5B-C as an example, Module M 520 may be one of a candidate set of service provider modules for Type Z 518. The number of modules indirectly depended upon by Module M 520 is one (that is, Module T 546).

One or more embodiments include identifying an attribute associated with service dependencies corresponding to a service provider module in the candidate set (Operation 710). The runtime environment 113 determines one or more module graphs corresponding to a service provider module identified as part of the candidate set of service provider modules at Operation 704. Various methods for determining a module graph may be used, as described above with reference to Operation 708.

The runtime environment 113 uses one or more module graphs to identify an attribute associated with service dependencies corresponding to a service provider module identified as part of the candidate set of service provider modules at Operation 704. Various methods for identifying an attribute may be used, examples of which are further described below.

In an example, a runtime environment 113 determines a number of service interfaces directly used by the service provider module identified at Operation 704. The runtime environment 113 may count the number of service interfaces directly used by the service provider module identified at Operation 704, as indicated by a module graph. Referring to FIGS. 5B and 5D as an example, Module M 520 may be one of a candidate set of service provider modules for Type Z 518. The number of service interfaces directly used by Module M 520 is one (that is, Type I 530).

In an example, a runtime environment 113 determines a number of service interfaces in a transitive closure of the service dependencies corresponding to the service provider module identified at Operation 704. The runtime environment 113 may count the number of service interfaces in the transitive closure, as indicated by a module graph. Referring to FIGS. 5B and 5D as an example, Module M 520 may be one of a candidate set of service provider modules for Type Z 518. A transitive closure of the service dependencies corresponding to Module M 520 includes: (a) Module M 520's use of Type I 530 and Module P 532's provision of Type I 530, and (b) Module P 532's use of Type J 538 and Module R 540's provision of Type J 538. The number of service interfaces in a transitive closure of the service dependencies corresponding to Module M 520 is two (that is, Type I 530 and Type J 538).

In an example, a runtime environment 113 determines a number of service provider modules that provide a service interface directly used by the service provider module identified at Operation 704. The runtime environment 113 may count the number of service provider modules that provide a service interface directly used by the service provider module identified at Operation 704, as indicated by a module graph. Referring to FIGS. 5B and 5D as an example, Module M 520 may be one of a candidate set of service provider modules for Type Z 518. Module M 520 directly uses the service interface Type I 530. The number of service provider modules that provide a service interface directly used by Module M 520 is one (that is, Module P 532).

In an example, a runtime environment 113 determines a number of service provider modules in a transitive closure of the service dependencies corresponding to the service provider module identified at Operation 704. The runtime environment 113 may count the number of service provider modules in the transitive closure, as indicated by a module graph. Referring to FIGS. 5B and 5D as an example, Module M 520 may be one of a candidate set of service provider modules for Type Z 518. The number of service provider modules in the transitive closure of the service dependencies corresponding to Module M 520 is two (that is, Module P 532, and Module R 540).

In an example, a runtime environment 113 determines a minimum number of service interfaces that may be directly or indirectly used by the service provider module identified at Operation 704. Referring to FIG. 9 as an example, FIG. 9 illustrates an example of a module graph 902. An initial node of the module graph 902 is Module N 524. The module graph 902 represents service dependencies corresponding to Module N 524. Module N 524 may be one of a candidate set of service provider modules for the service interface Type Z 518, as illustrated in FIG. 5B. Module N 524 uses Type II 912. Each of Module PP 914 and Module QQ 918 provides Type II 912. Module PP 914 further uses Type JJ 919. Module RR 922 provides Type JJ 919. Module QQ 918 does not use any other service interfaces. If Module PP 914 is selected for providing Type II 912, then two service interfaces are directly or indirectly used by Module N 524 (that is, Type II 912 and Type JJ 919). If Module QQ 918 is selected for providing Type II 912, then one service interface is directly or indirectly used by Module N 524 (that is, Type II 912). Hence, a minimum number of service interfaces directly or indirectly used by Module N 524 is one.

One or more embodiments include identifying an attribute associated with both module dependencies and service dependencies corresponding to a service provider module in the candidate set. Various methods for identifying an attribute may be used, examples of which are further described below.

In an example, a runtime environment 113 determines an attribute associated with one or more service provider modules in a transitive closure of service dependencies corresponding to the service provider module identified at Operation 704. The attribute may be, for example,
(a) a number of modules directly depended upon by one or more service provider modules in a transitive closure of the service dependencies corresponding to the service provider module identified at Operation 704;
(b) a number of modules directly or indirectly depended upon by one or more service provider modules in the transitive closure of the service dependencies corresponding to the service provider module identified at Operation 704;
(c) a number of modules indirectly depended upon by one or more service provider modules in the transitive closure of the service dependencies corresponding to the service provider module identified at Operation 704;
(d) a number of service interfaces directly used by one or more service provider modules in the transitive closure of the service dependencies corresponding to the service provider module identified at Operation 704; and/or
(e) a number of service provider modules that provide a service interface directly used by one or more service provider modules in the transitive closure of the service dependencies corresponding to the service provider module identified at Operation 704.

Referring to FIG. 5E as an example, Module M 520 may be one of a candidate set of service provider modules for Type Z 518. Module P 532 is one of the modules in the transitive closure of the service dependencies corresponding to Module M 520. A number of modules directly depended upon by Module P 532 is one (that is, Module Q 536).

Referring again to FIG. 5E as another example, Module M 520 may be one of a candidate set of service provider modules for Type Z 518. Module P 532 is one of the modules in the transitive closure of the service dependencies corresponding to Module M 520. A number of service interfaces directly used by Module P 532 is one (that is, Type J 538).

In an example, a runtime environment 113 determines a number of modules in a module graph that (a) starts with the service provider module identified at Operation 704 as an initial node and (b) recursively traverses both module dependencies and service dependencies of the service provider module identified at Operation 704 and each module identified thereafter. Referring to FIG. 5E as an example, Module M 520 may be one of a candidate set of service provider modules for Type Z 518. The module graph 510 is an example of a module graph that (a) starts with Module M 520 as an initial node and (b) recursively traverses both module dependencies and service dependencies of Module M 520 and each module identified thereafter. The number of modules in the module graph 510 is eleven (that is, Module M 520, Module O 528, Module P 532, Module Q 536, Module R 540, Module S 544, Module T 546, Module U 550, Module V 554, Module W 556, and Module X 560).

One or more embodiments include identifying attributes directly associated with a service provider module identified as part of the candidate set of service provider modules at Operation 704. Various methods for identifying an attribute may be used, examples of which are further described below.

In an example, a runtime environment 113 determines whether all service interfaces directly used by the service provider module identified at Operation 704 are able to be bound. Referring to FIGS. 5B and 5D as an example, Module M 520 may be one of a candidate set of service provider modules for Type Z 518. Services interfaces directly used by Module M 520 are: Type I 530. Type I 530 is able to be bound if there is at least one module that provides Type I 530. Conversely, Type I 530 is not able to be bound if there are no modules that provide Type I 530.

In an example, a runtime environment 113 determines whether the service provider module identified at Operation 704 exports a package or type for other modules to access. Referring to FIGS. 5B and 5D as an example, Module M 520 may be one of a candidate set of service provider modules for Type Z 518. The module declaration of Module M 520 may be examined to determine whether Module M 520 exports any packages or types. An exportation of a package or type may be indicated using, for example, an exports clause.

One or more embodiments include identifying statically-available information associated with a service provider module identified as part of the candidate set of service provider modules at Operation 704. Various methods for identifying an attribute may be used, examples of which are further described below.

In an example, a runtime environment 113 determines a code footprint of a set of modules in a transitive closure of the module dependencies corresponding to a particular service provider module identified at Operation 704. The code footprint is measured by at least one of: (i) a number of types in the set of modules, (ii) a number of classes in the set of modules; (iii) a total number of code lines in the set of modules; and/or (iv) a memory space occupied by the set of modules.

In an example, a runtime environment 113 determines an attribute associated with computational constructs in a set of modules in a transitive closure of the module dependencies corresponding to a particular service provider module identified at Operation 704. Examples of attributes include: (i) an average number of code lines per method in the set of modules; (ii) a total number of code lines comprising a decision logic in the set of modules; (iii) an average number of code lines comprising a decision logic per method in the set of modules; (iv) a total number of loops in the set of modules; (v) an average number of loops per method in the set of modules; and (vi) an average number of parameters per method in the set of modules.

One or more embodiments include identifying dynamically-available information associated with a service provider module identified as part of the candidate set of service provider modules at Operation 704. Various methods for identifying an attribute may be used, examples of which are further described below.

In an example, a runtime environment 113 determines an emulated or estimated memory footprint associated with selecting a particular service provider module identified at Operation 704. The runtime environment 113 executes (or emulates execution of) the application which includes the instructions identified at Operation 702. During the execution, the particular service provider module is selected for the particular service interface. A memory footprint necessary for executing the application (and/or a particular service thereof) is determined. The memory footprint may include memory associated with code, data, heap memory, call stacks, data structures, shared libraries, and/or a virtual machine (such as, a JVM).

In an example, a runtime environment 113 determines an emulated or estimated number of processor cycles associated with selecting a particular service provider module identified at Operation 704. The runtime environment 113 executes (or emulates execution of) the application which includes the instructions identified at Operation 702. During the execution, the particular service provider module is selected for the particular service interface. A number of processor cycles necessary for executing the application (and/or a particular service thereof) is determined.

In an example, a runtime environment 113 determines a number of objects that are (a) instantiated if a particular service provider module identified at Operation 704 is selected for the particular service interface and (b) configured to occupy a memory space above a particular threshold. The runtime environment 113 executes (or emulates execution of) the application which includes the instructions identified at Operation 702. During the execution, the particular service provider module is selected for the particular service interface. Objects that are instantiated are monitored. A number of objects that occupy a memory space above a particular threshold is determined.

In an embodiment, the runtime environment 113 performs Operation 708, Operation 710, and/or other operations for identifying attributes with respect to each of the candidate set of service provider modules. The runtime environment 113 determines one or more attributes associated with each service provider module.

6.3 Determining Attribute Values for Service Provider Modules

One or more embodiments include determining whether there is any specification of attributes to be prioritized during analysis of the attributes (Operation 712). The runtime environment 113 determines whether there are any attributes to prioritize based on a configuration. In an embodiment, the configuration is set by the host system. The configuration may be set, for example, via a command line. In an embodiment, the configuration is set by the application that includes the instructions identified at Operation 702. As an example, the instructions to obtain instances of service implementations for the particular service interface, identified at Operation 702, may be associated with a specification of one or more attributes that are prioritized during the analysis of attributes. The prioritized attributes may be specified as an input to a lookup procedure that obtains instances of service implementations for the particular service interface. Attributes that are prioritized are given more weight during the analysis of attributes.

One or more embodiments include analyzing one or more attributes to determine an overall score for each of the candidate set of service provider modules identified at Operation 704 (Operation 714). The runtime environment 113 determines an overall score for a service provider module by: (a) determining a score for each attribute identified using Operation 708 and/or Operation 710, and (b) determining a weight for each attribute identified using Operation 708 and/or Operation 710.

The runtime environment 113 determines a score for each attribute identified using Operation 708 and/or Operation 710. As an example, an attribute may be a number of modules that are directly depended upon by the service provider module identified at Operation 704. The number of modules that are directly depended upon by the service provider module identified at Operation 704 may be used as a score corresponding to the attribute. Alternatively, the number of modules that are directly depended upon by the service provider module identified at Operation 704 may be normalized by the total number of observable modules. The number of modules that are directly depended upon by the service provider module identified at Operation 704 may be adjusted based on other factors. The normalized and/or adjusted number may be used as a score corresponding to the attribute.

The runtime environment 113 determines a weight for each attribute identified using Operation 708 and/or Operation 710. The weight corresponding to each attribute may be stored as part of a default configuration of a runtime environment 113. As an example, one attribute may be a number of modules that are directly depended upon by the service provider module identified at Operation 704. Another attribute may be a number of service interfaces directly used by the service provider module identified at Operation 704. The latter attribute may be associated with a greater weight than the former attribute. The weighting in this example indicates that the number of service interfaces directly used by the service provider module is more important than the number of modules directly depended upon by the service provider module, when determining whether to select the service provider module for providing the particular service interface.

The runtime environment 113 applies the weights, corresponding to each attribute, to the scores, corresponding to each attribute, to obtain an overall score for at least one service provider module of the candidate set of service provider modules identified at Operation 704. The overall score may also be referred to as a "metric" for the service provider module.

Referring to FIGS. 5C-D as an example, Module M 520 may be one of a candidate set of service provider modules for Type Z 518. A number of modules directly depended upon by Module M 520 may be two (that is, Module S 544 and Module O 528). A number of service interfaces directly used by Module M 520 may be one (that is, Type I 530). A weight for the number of modules directly depended upon by Module M 520 may be 0.3. A weight for the number of service interfaces directly used by Module M 520 may be 0.7. An overall score for Module M 520 may be determined as follows: $0.3 \times 2 + 0.7 \times 1 = 1.3$. In this example, since a service provider module that depends on more modules and/or uses more service interfaces will bring in more code into the runtime environment, a lower overall score indicates a "better" service provider module, which occupies less memory space and/or executes more efficiently.

One or more embodiments include analyzing one or more attributes, with priority given to the specified attributes, to determine an overall score for each of the candidate set of service provider modules identified at Operation 704 (Operation 716). The runtime environment 113 determines a score for each attribute identified using Operation 708 and/or Operation 710, as described above with reference to Operation 714.

The runtime environment 113 determines a weight for each attribute, based on which attributes are being prioritized. For example, attributes that are prioritized are given decreased weight.

As an example, a default configuration of a runtime environment 113 may provide the following:

(a) the number of modules directly depended upon by a service provider module is an attribute associated with a weight of 0.5; and (b) the number of service interfaces directly used by a service provider module is an attribute associated with a weight of 0.7.

An application may specify that the number of modules directly depended upon by a service provider module is to be prioritized. The runtime environment 113 may decrease the weight associated with the number of modules directly depended upon by a service provider module from 0.5 to 0.3. Hence, the weights to be applied to the attributes are:
(a) the number of modules directly depended upon by a service provider module is an attribute associated with a weight of 0.3; and
(b) the number of service interfaces directly used by a service provider module is an attribute associated with a weight of 0.7.

The runtime environment 113 applies the weights, corresponding to each attribute, to the scores, corresponding to each attribute, to obtain an overall score for at least one service provider module of the candidate set of service provider modules identified at Operation 704, as described above with reference to Operation 714.

6.4 Ranking Service Provider Modules

One or more embodiments include returning a ranked set of one or more instances of service implementations for the particular service interface, based on the overall scores of the candidate set of service provider modules (Operation 718). Various methods for returning the ranked set of instances of service implementations for the particular service interface may be used, as further described below.

In an embodiment, the runtime environment 113 determines an overall score for each of the candidate set of service provider modules. The runtime environment 113 ranks the candidate set of service provider modules based on the overall scores. The runtime environment 113 determines an ordered list of the candidate set of service provider modules, wherein the service provider module with the best (for example, lowest) overall score is positioned first in the ordered list.

The runtime environment 113 instantiates one or more objects whose type is that of each service implementation corresponding to each of the candidate set of service provider modules. The runtime environment 113 ranks the objects based on the position of the corresponding service provider module in the ordered list. For example, the objects that are instances of service implementations corresponding to the service provider module in the first position, of the ordered list of the candidate set of service provider modules, are ranked first. The objects that are instances of service implementations corresponding to the service provider module in the second position, of the ordered list of the candidate set of service provider modules, are ranked next. Hence, the runtime environment 113 returns a ranked set of instances of service implementations for the particular service interface, in response to the instructions identified at Operation 702. The ranked set of instances of service implementations may be returned in various data structures, such as an array of objects.

In an embodiment, the runtime environment 113 determines an overall score for each of the candidate set of service provider modules. However, the runtime environment 113 does not return instances of service implementations corresponding to all of the service provider modules. The runtime environment 113 instantiates and/or returns objects corresponding to only a subset of service implementations corresponding to the candidate set of service provider modules.

As an example, the runtime environment 113 may select a subset of the candidate set of service provider modules that are associated with an overall score below a particular threshold. As another example, the runtime environment 113 may select n of the candidate set of service provider modules that are associated with the best (for example, lowest) overall scores, where n is an integer equal to or greater than one. As another example, the runtime environment 113 may select n % of the candidate set of service provider modules that are associated with the best (for example, lowest) overall scores, where n % is a percentage. After selecting the subset of the candidate set of service provider modules, the runtime environment 113 instantiates objects whose type is that of each service implementation corresponding to each of the subset of the candidate set of service provider modules. The runtime environment 113 ranks the instantiated objects, as described above.

In an embodiment, the runtime environment 113 determines an overall score for each of the candidate set of service provider modules, in the order in which each service provider module was identified at Operation 704. As soon as the runtime environment 113 finds a particular number of service provider modules that are associated with an overall score below a particular threshold, the runtime environment 113 stops analyzing the remaining service provider modules in the candidate set. The runtime environment 113 ranks the service provider modules analyzed thus far. The runtime environment 113 instantiates objects whose type is that of each service implementation corresponding to each of the service provider modules analyzed thus far. The runtime environment 113 ranks the instantiated objects, as described above.

In an embodiment, the runtime environment 113 eliminates a particular service provider module from the candidate set of service provider modules based on one or more attributes. The runtime environment 113 does not determine an overall score for the eliminated service provider module, but determines overall scores for the remainder of the candidate set of service provider modules. The runtime environment 113 ranks the service provider modules that have not been eliminated. The runtime environment 113 instantiates objects whose type is that of each service implementation corresponding to each of the candidate set of service provider modules, other than the eliminated service provider module. The runtime environment 113 ranks the instantiated objects, as described above.

As an example, a configuration of a runtime environment 113 may denote that any service provider module that includes an exportation of a package is not to be selected for providing any service interface. The runtime environment 113 may identify a candidate set of three service provider modules for a particular service interface. One of the three service provider module may export a package, while the other two service provider modules do not export any packages. The runtime environment 113 may eliminate the service provider module that exports a package from the candidate set of service provider modules. The runtime environment 113 may determine an overall score corresponding to each of the remaining two service provider modules. The runtime environment 113 may return a ranked set of instances of service implementations corresponding to the remaining two service provider modules.

As another example, a runtime environment 113 may determine that, after eliminating service provider modules based on a particular attribute, only one service provider module remains in the candidate set of service provider modules. Then, there is no need to determine an overall score corresponding to any service provider modules. The runtime environment 113 returns the instances of service implementations corresponding to the sole service provider module remaining in the candidate set of service provider modules.

Additional and/or alternative methods for returning the ranked set of instances of service implementations for the particular service interface may be used.

In an embodiment, the particular type including the instructions identified at Operation 702 (that is, the particular type corresponding to the service consumer module) also includes instructions that (a) select one or more of the instances of service implementations returned at Operation 718 and/or (b) operate on one or more of the instances of service implementations returned at Operation 718 (such as, the selected instances). Selecting the instances of service implementations may be based on the positions of the selected instances in the ranked set of instances of service implementations. Operating on the selected instances may include, for example, accessing a field of the selected instances or executing a method of the selected instances.

As an example, the particular type may include instructions to execute a method corresponding to the first instance from the ranked set of instances of service implementations. In response to the instructions, the runtime environment 113 may identify the type of the first instance. The runtime environment 113 may execute the method defined by the identified type. In this example, the identified type is a service implementation corresponding to the service provider module associated with the best (for example, lowest) overall score.

As another example, the particular type may include instructions to further analyze one or more of the candidate set of service provider modules. The particular type may analyze a service provider module based on a domain-specific attribute that is related to the real-world functionality offered by the service provider module. Examples of domain-specific attributes include (a) whether the service provider module includes a particular field, method, service, and/or feature, and (b) an annotation associated with the service provider module indicating its quality, source, version number, and/or other attribute. A domain-specific attribute may be explicitly denoted within the service provider module. The particular type may include instructions to execute a method corresponding to the first instance, in the ranked set of instances of service implementations, that is associated with a particular domain-specific attribute. The particular type does not include instructions to execute a method corresponding to the other instances in the ranked set of instances of service implementations. Additionally or alternatively, the particular type may analyze a service provider module based on metadata explicitly denoted in association with the service provider module, such as a creation date and/or last modified date of the service provider module. The particular type may include instructions to execute a method corresponding to the first instance, in the ranked set of instances of service implementations, that is associated with a creation date within the past year. The particular type does not include instructions to execute a method corresponding to the other instances in the ranked set of instances of service implementations.

As another example, the particular type may include instructions to execute methods corresponding to multiple instances of service implementations corresponding to the candidate set of service provider modules. The particular type may include instructions to execute methods corresponding to the instances in the first n positions of the ranked set of instances of service implementations, where n is an integer equal to or greater than one.

Figure 8:
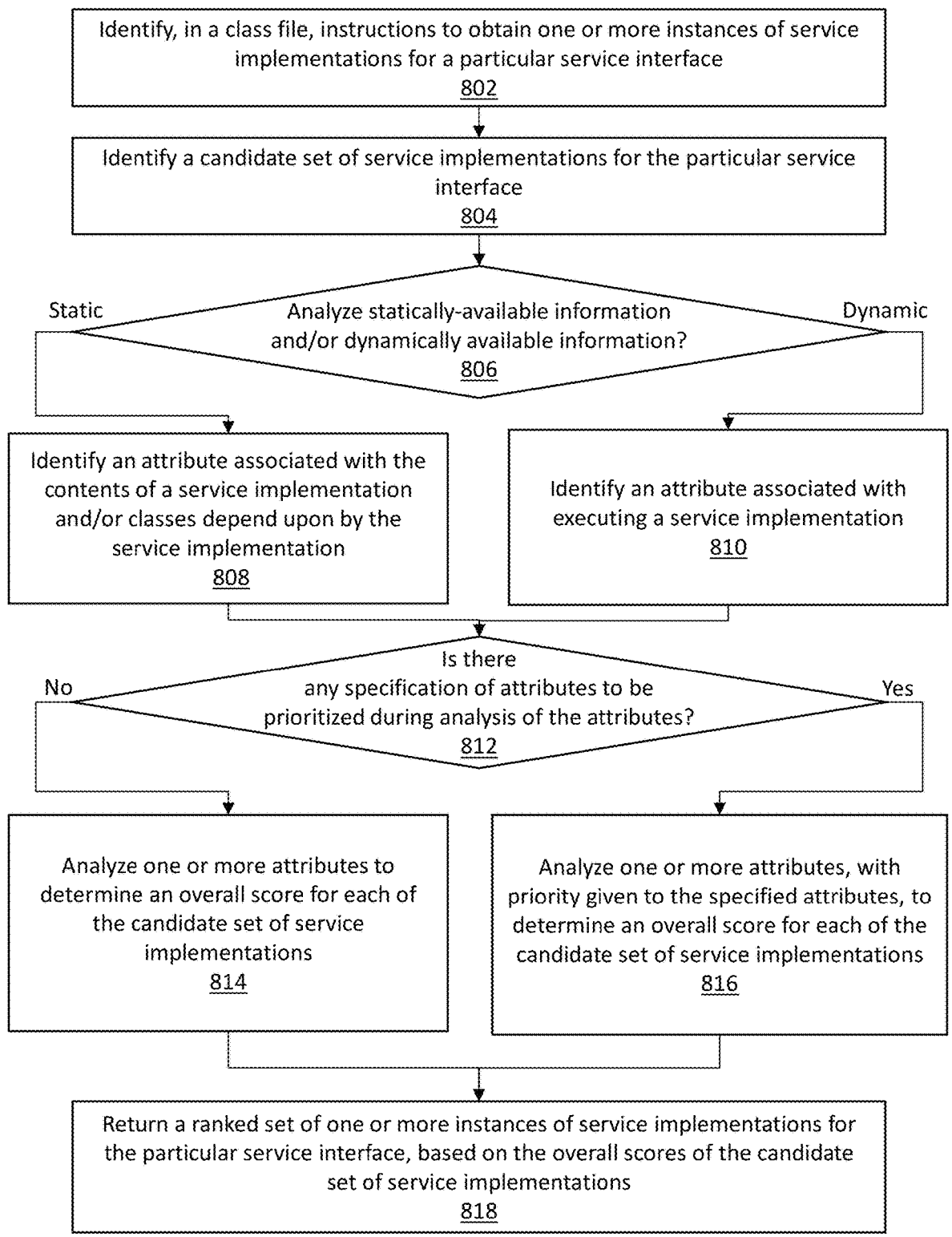
FIG. 8 illustrates an example set of operations for ranking service implementations for a particular service interface, in accordance with one or more embodiments.

7. Ranking Service Implementations for Implementing A Particular Service Interface Based on Statically-Available and/or Dynamically-Available Information FIG. 8 illustrates an example set of operations for ranking service implementations for a particular service interface, in accordance with one or more embodiments. FIG. 8 focuses on ranking service implementations based on statically-available and dynamically-available information related to the service implementations and/or classes depended upon by the service implementations. The service implementations may be implemented in a module environment or a non-module environment. One or more operations illustrated in FIG. 8 may be modified, rearranged, or omitted all together. Accordingly, the particular sequence of operations illustrated in FIG. 8 should not be construed as limiting the scope of one or more embodiments.

One or more embodiments include identifying instructions to obtain one or more instances of service implementations for a particular service interface (Operation 802). Descriptions relating to identifying instructions to obtain one or more instances of service implementations for a particular service interface are included above with reference to Operation 702. One difference between Operation 802 and Operation 702 is that the particular type including the identified instructions may but is not necessarily included within a module. The particular type may be executed in a module environment or a non-module environment.

One or more embodiments include identifying a candidate set of service implementations for the particular service interface (Operation 804). Based on the instructions identified at Operation 802, the runtime environment 113 searches through one or more repositories (such as, a module path and/or class path) to identify service implementations for the particular service interface. A type that serves as a service implementation for the particular service interface may include a keyword, such as implements.

One or more embodiments include determining whether to analyze statically-available information and/or dynamically-available information (Operation 806). The runtime environment 113 determines whether to analyze statically-available information and/or dynamically-available information based on a configuration. Various methods for setting the configuration are described above with reference to Operation 706.

One or more embodiments include identifying an attribute associated with the contents of a service implementation and/or classes depended upon by the service implementation (Operation 808). Various methods for identifying an attribute may be used, examples of which are further described below. The attribute may be but is not necessarily explicitly stated or included in any code executed by the runtime environment 113.

In an example, a runtime environment 113 determines a code footprint of a particular service implementation identified at Operation 804. In another example, a runtime environment 113 determines a code footprint of a particular service implementation identified at Operation 804 and code that is directly or indirectly depended upon by the particular service implementation. Code footprint is further discussed above with reference to Operation 708 and/or Operation 710.

In an example, a runtime environment 113 determines the computational constructs in a particular service implementation identified at Operation 804. In another example, a runtime environment 113 determines the computational constructs in a particular service implementation identified at Operation 804 and code that is directly or indirectly depended upon by the particular service implementation. Computational constructs are further discussed above with reference to Operation 708 and/or Operation 710.

One or more embodiments include identifying an attribute associated with executing (or emulating execution of) a service implementation (Operation 810). Various methods for identifying an attribute may be used, examples of which are further described below. The attribute may be but is not necessarily explicitly stated or included in any code executed by the runtime environment 113.

In an example, a runtime environment 113 determines an emulated or estimated memory footprint associated with selecting a particular service implementation identified at Operation 804. Memory footprint is further discussed above with reference to Operation 708 and/or Operation 710.

In an example, a runtime environment 113 determines an emulated or estimated number of processor cycles associated with selecting a particular service implementation identified at Operation 804. Processor cycles are further discussed above with reference to Operation 708 and/or Operation 710.

In an example, a runtime environment 113 determines a number of objects that are (a) instantiated if a particular service implementation identified at Operation 804 is selected for the particular service interface and (b) configured to occupy a memory space above a particular threshold. Identifying objects configured to occupy a memory space above a particular threshold is further discussed above with reference to Operation 708 and/or Operation 710.

In an embodiment, the runtime environment 113 performs Operation 808, Operation 810, and/or other operations for identifying attributes with respect to each of the candidate set of service implementations. The runtime environment 113 determines one or more attributes associated with each service implementation.

One or more embodiments include determining whether there is any specification of attributes to be prioritized during analysis of the attributes (Operation 812). The runtime environment 113 determines whether there are any attributes to prioritize based on a configuration. Various methods for setting a configuration are described above with reference to Operation 712.

One or more embodiments include analyzing one or more attributes to determine an overall score for each of the candidate set of service implementations identified at Operation 804 (Operation 814). The runtime environment 113 determines a score and a weight for each attribute identified using Operation 808 and/or Operation 810.

The following is an example illustrating determining a score for an attribute, where the attribute is a code footprint of a particular service implementation identified at Operation 804. The code footprint of the particular service implementation may be, for example, 28 MB. The code footprint may be used as a score corresponding to the attribute. Alternatively, the code footprint may be normalized and/or adjusted based on the average code footprint of other service implementations in the candidate set and/or other factors. The normalized and/or adjusted number may be used as a score corresponding to the attribute. Alternatively, the code footprint may be mapped to a particular score. For example, code footprints within the range 0 to 10 MB may be mapped to a score of 1. Code footprints within the range of 10 to 20 MB may be mapped to a score of 2. Code footprints within the range of 20 to 30 MB may be mapped to a score of 3. Since the code footprint of the particular service implementation is 28 MB, the score corresponding to the code footprint attribute is 2.

The runtime environment 113 applies the weights, corresponding to each attribute, to the scores, corresponding to each attribute, to obtain an overall score for at least one service implementation of the candidate set of service implementations identified at Operation 804. Descriptions relating to determining scores corresponding to attributes, determining weights corresponding to attributes, and obtaining overall scores corresponding to the candidate set of service implementations are included above with reference to Operation 714.

One or more embodiments include analyzing one or more attributes, with priority given to the specified attributes, to determine an overall score for each of the candidate set of service implementations identified at Operation 804 (Operation 816). The runtime environment determines a score and a weight for each attribute identified using Operation 808 and/or Operation 810.

The runtime environment 113 determines a weight for each attribute, based on which attributes are being prioritized. For example, attributes that are prioritized are given decreased weight. Descriptions relating to determining weights based on prioritized attributes are included above with reference to Operation 716.

The runtime environment 113 applies the weights, corresponding to each attribute, to the scores, corresponding to each attribute, to obtain an overall score for at least one service implementation of the candidate set of service implementations identified at Operation 804. Descriptions relating to determining scores corresponding to attributes, determining weights corresponding to attributes, and obtaining overall scores corresponding to the candidate set of service implementations are included above with reference to Operation 714 and/or Operation 716.

One or more embodiments include returning a ranked set of one or more instances of service implementations for the particular service interface, based on the overall scores of the candidate set of service implementations (Operation 818). Various methods for returning the ranked set of instances of service implementations for the particular service interface may be used, as further described below.

In an embodiment, the runtime environment 113 determines an overall score for each of the candidate set of service implementations. The runtime environment 113 ranks the candidate set of service implementations based on the overall scores. The runtime environment 113 determines an ordered list of the candidate set of service implementations, wherein the service implementation with the best (for example, lowest) overall score is positioned first in the ordered list.

The runtime environment 113 instantiates one or more objects whose type is that of each of the candidate set of service implementations. The runtime environment 113 ranks the objects based on the position of the corresponding service implementation in the ordered list. For example, the objects that are instances of service implementations corresponding to the service implementation in the first position, of the ordered list of the candidate set of service implementations, are ranked first. The objects that are instances of service implementations corresponding to the service implementation in the second position, of the ordered list of the candidate set of service implementations, are ranked next. Hence, the runtime environment 113 returns a ranked set of instances of service implementations for the particular service interface, in response to the instructions identified at Operation 802. The ranked set of instances of service implementations may be returned in various data structures, such as an array of objects.

In an embodiment, the runtime environment 113 determines an overall score for each of the candidate set of service implementations. However, the runtime environment 113 does not return instances of all service implementations. The runtime environment 113 instantiates and/or return objects corresponding to only a subset of the candidate set of service implementations.

As an example, the runtime environment 113 may select a subset of the candidate set of service implementations that are associated with an overall score below a particular threshold. As another example, the runtime environment 113 may select n of the candidate set of service implementations that are associated with the best (for example, lowest) overall scores, where n is an integer equal to or greater than one. As another example, the runtime environment 113 may select n % of the candidate set of service implementations that are associated with the best (for example, lowest) overall scores, where n % is a percentage. After selecting the subset of the candidate set of service implementations, the runtime environment 113 instantiates objects whose type is that of each of the subset of the candidate set of service implementations. The runtime environment 113 ranks the instantiated objects, as described above.

In an embodiment, the runtime environment 113 determines an overall score for each of the candidate set of service implementations, in the order in which each service implementation was identified at Operation 804. As soon as the runtime environment 113 finds a particular number of service implementations that are associated with an overall score below a particular threshold, the runtime environment 113 stops analyzing the remaining service implementations in the candidate set. The runtime environment 113 ranks the service implementations analyzed thus far. The runtime environment 113 instantiates objects whose type is that of each of the service implementations analyzed thus far. The runtime environment 113 ranks the instantiated objects, as described above.

In an embodiment, the runtime environment 113 eliminates a particular service implementation from the candidate set of service implementations based on one or more attributes. The runtime environment 113 does not determine an overall score for the eliminated service implementation, but determines overall scores for the remainder of the candidate set of service implementations. The runtime environment 113 ranks the service implementations that have not been eliminated. The runtime environment 113 instantiates objects whose type is that of each service implementation, other than the eliminated service implementation. The runtime environment 113 ranks the instantiated objects, as described above.

Additional and/or alternative methods for returning the ranked set of instances of service implementations for the particular service interface may be used.

In an embodiment, the particular type including the instructions identified at Operation 802 also includes instructions that that (a) select one or more of the instances of service implementations returned at Operation 818 and/or (b) operate on one or more of the instances of service implementations returned at Operation 818 (such as, the selected instances). Descriptions relating to instructions operating on instances of service implementations are included above with reference to Operation 718.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
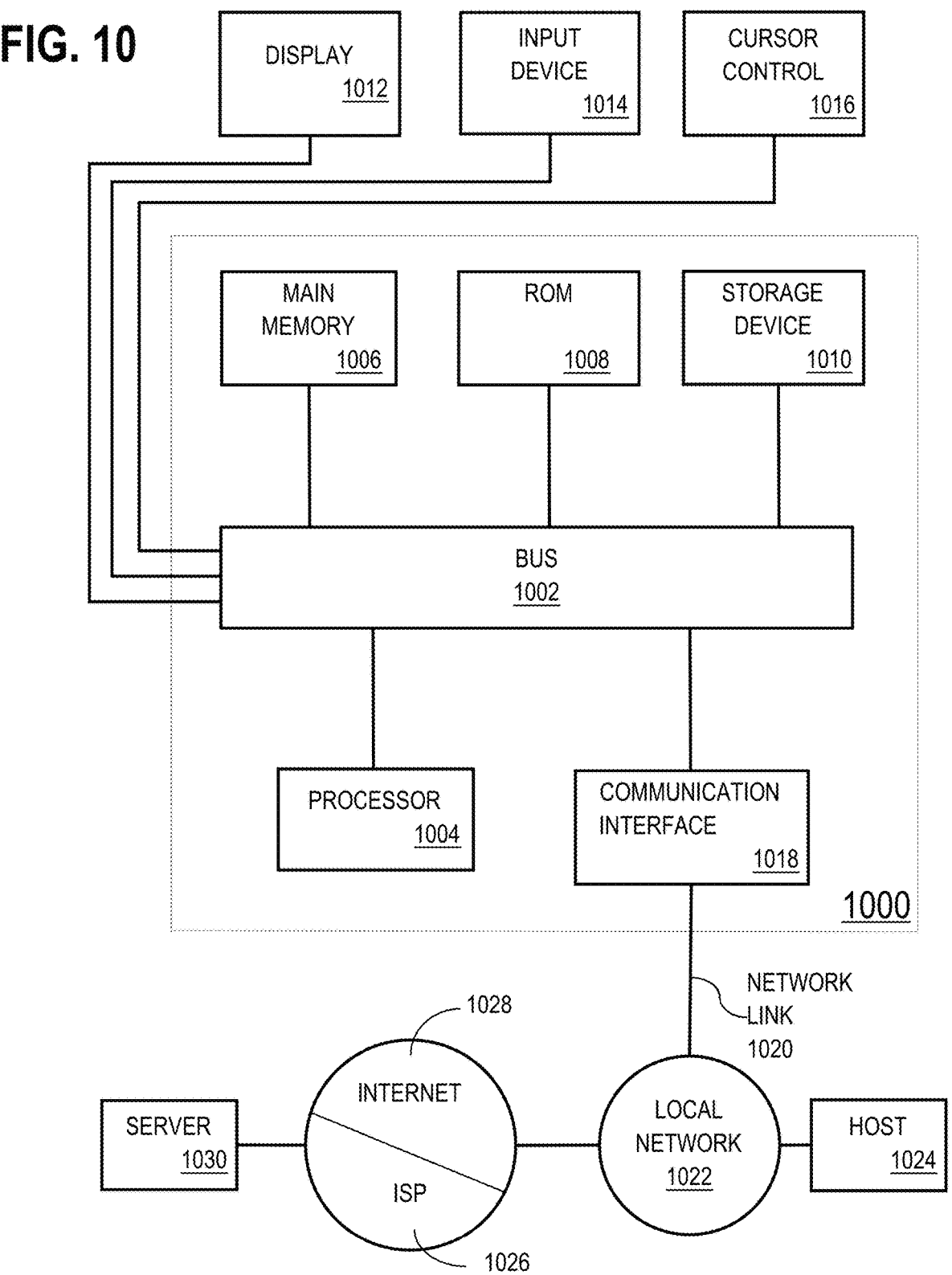
FIG. 10 illustrates a system in accordance with one or more embodiments.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:

identifying a plurality of service provider modules in a module system, wherein the module system specifies accessibility of each service provider module in the plurality of service provider modules to other modules in the plurality of service provider modules, the plurality of service provider modules comprising a first service provider module and a second service provider module;

wherein each of the plurality of service provider modules includes (a) a respective service implementation that implements a particular service interface, and (b) a respective explicit declaration indicating that the respective service provider module provides the particular service interface by means of the respective service implementation;

identifying a set of attributes comprising at least one of:
(a) a first attribute associated with module dependencies corresponding to the first service provider module, and (b) a second attribute associated with service dependencies corresponding to the first service provider module;

wherein each module dependency is explicitly indicated by at least one module;

wherein each service dependency is associated with a use of a service interface that is explicitly indicated by at least one module;

based on at least one of the set of attributes: generating a ranking of at least a subset of the plurality of service provider modules, wherein the ranking of a particular service provider module, in the subset of the plurality of service provider modules, is based at least on a source of the particular service provider module.

2. The medium of claim 1, wherein the first attribute associated with the module dependencies corresponding to the first service provider module comprises at least one of:
   (a) a number of modules directly depended upon by the first service provider module;
   (b) a number of modules directly or indirectly depended upon by the first service provider module; and
   (c) a number of modules indirectly depended upon by the first service provider module.

3. The medium of claim 1, wherein the second attribute associated with the service dependencies corresponding to the first service provider module comprises at least one of:
   (a) a number of service interfaces directly used by the first service provider module;
   (b) a number of service interfaces in a transitive closure of the service dependencies corresponding to the first service provider module;
   (c) a number of service provider modules that provide a service interface directly used by the first service provider module; and
   (d) a number of service provider modules in a transitive closure of the service dependencies corresponding to the first service provider module.

4. The medium of claim 1, wherein the second attribute associated with the service dependencies corresponding to the first service provider module comprises at least one of:
   (a) a number of modules directly depended upon by one or more service provider modules in a transitive closure of the service dependencies corresponding to the first service provider module;
   (b) a number of modules directly or indirectly depended upon by one or more service provider modules in the transitive closure of the service dependencies corresponding to the first service provider module;
   (c) a number of modules indirectly depended upon by one or more service provider modules in the transitive closure of the service dependencies corresponding to the first service provider module;
   (d) a number of service interfaces directly used by one or more service provider modules in the transitive closure of the service dependencies corresponding to the first service provider module; and
   (e) a number of service provider modules that provide a service interface directly used by one or more service provider modules in the transitive closure of the service dependencies corresponding to the first service provider module.

5. The medium of claim 1, wherein identifying the set of attributes comprises:
   performing a traversal of both module dependencies and service dependencies using the first service provider module as an initial node comprising:
   identifying (a) modules directly depended upon by the first service provider module, and (b) modules that provide a service interface directly used by the first service provider module;
   recursively identifying (a) modules directly depended upon by each identified module and (b) modules that provide a service interface directly used by each identified module;
   determining a number of modules in a particular set of modules comprising: (a) the first service provider module, (b) modules directly depended upon by any module identified during the traversal, and (c) modules that provide a service interface directly used by any module identified during the traversal.

6. The medium of claim 1, wherein the second attribute associated with the service dependencies corresponding to the first service provider module comprises: whether all service interfaces directly used by the first service provider module are able to be bound.

7. The medium of claim 1, wherein identifying the set of attributes comprises: determining whether the first service provider module exports a package or type for other modules to access.

8. The medium of claim 1, wherein the first attribute associated with the module dependencies corresponding to the first service provider module comprises: an attribute associated with a set of modules in a transitive closure of the module dependencies corresponding to the first service provider module.

9. The medium of claim 1, wherein the second attribute associated with the service dependencies corresponding to the first service provider module comprises: an attribute associated with a set of modules in a transitive closure of the service dependencies corresponding to the first service provider module.

10. The medium of claim 1, wherein the first attribute associated with the module dependencies corresponding to the first service provider module comprises at least one of:
    (a) a number of types in a set of modules in a transitive closure of the module dependencies corresponding to the first service provider module;
    (b) a number of classes in the set of modules;
    (c) a total number of code lines in the set of modules;
    (d) an average number of code lines per method in the set of modules;
    (e) a total number of code lines comprising a decision logic in the set of modules;
    (f) an average number of code lines comprising a decision logic per method in the set of modules;
    (g) a total number of loops in the set of modules;
    (h) an average number of loops per method in the set of modules;
    (i) an average number of parameters per method in the set of modules; and
    (j) a memory space occupied by the set of modules.

11. The medium of claim 1, wherein the first attribute associated with the module dependencies corresponding to the first service provider module comprises at least one of:
    (a) emulated or estimated memory footprint associated with selecting the first service provider module;
    (b) emulated or estimated number of processor cycles associated with selecting the first service provider module; and
    (c) a number of objects that are (i) instantiated if the first service provider module is selected for the particular service interface and (ii) configured to occupy a memory space above a particular threshold.

12. The medium of claim 1, wherein a module dependency is a dependency indicated by a first module on a second module, whereby the second module must be present in order for the first module to be at least one of compiled and executed.

13. The medium of claim 1, wherein a service dependency is a dependency from a particular module to a set of one or more module in which (a) the particular module indicates that the particular module uses a service interface and (b) each of the set of modules indicates a provision of the service interface.

14. The medium of claim 1, wherein the set of attributes further comprise at least one of: (a) a third attribute associated with module dependencies corresponding to the second service provider module, and (b) a fourth attribute associated with service dependencies corresponding to the second service provider module.

15. The medium of claim 14, wherein generating a ranking of at least the subset of the plurality of service provider modules comprises:
generating a first metric for the first service provider module based on at least one of: the first attribute and the second attribute;
generating a second metric for the second service provider module based on at least one of: the third attribute and the fourth attribute; and
ranking the first service provider module and the second service provider module in an ordered list based on the first metric and the second metric.

16. The medium of claim 14, wherein generating a ranking of at least the subset of the plurality of service provider modules comprises:
generating a first metric for the first service provider module based on at least one of: the first attribute and the second attribute;
generating a second metric for the second service provider module based on at least one of: the third attribute and the fourth attribute;
determining that the first metric is below a particular threshold;
determining that the second metric is above the particular threshold;
generating the ranking that includes the first service provider module but does not include the second service provider module.

17. The medium of claim 14, wherein generating a ranking of at least the subset of the plurality of service provider modules comprises:
identifying a specification of a particular attribute, of the set of attributes, to be prioritized in generating metrics for the plurality of service provider modules;
applying an algorithm that prioritizes the particular attribute to generate a first metric for the first service provider module based on at least one of: the first attribute and the second attribute;
applying the algorithm that prioritizes the particular attribute to generate a second metric for the second service provider module based on at least one of: the third attribute and the fourth attribute;
ranking the first service provider module and the second service provider module in an ordered list based on the first metric and the second metric.

18. The medium of claim 1, wherein the operations further comprise:
generating a ranked set of instances of service implementations based on the ranking of at least the subset of the plurality of service provider modules.

19. A method comprising:
identifying a plurality of service provider modules in a module system, wherein the module system specifies accessibility of each service provider module in the plurality of service provider modules to other modules in the plurality of service provider modules, the plurality of service provider modules comprising a first service provider module and a second service provider module;
wherein each of the plurality of service provider modules includes (a) a respective service implementation that implements a particular service interface, and (b) a respective explicit declaration indicating that the respective service provider module provides the particular service interface by means of the respective service implementation;
identifying a set of attributes comprising at least one of: (a) a first attribute associated with module dependencies corresponding to the first service provider module, and (b) a second attribute associated with service dependencies corresponding to the first service provider module;
wherein each module dependency is explicitly indicated by at least one module;
wherein each service dependency is associated with a use of a service interface that is explicitly indicated by at least one module;
based on at least one of the set of attributes: generating a ranking of at least a subset of the plurality of service provider modules, wherein the ranking of a particular service provider module, in the subset of the plurality of service provider modules, is based at least on a source of the particular service provider module,
wherein the method is performed by at least one device including a hardware processor.

20. The method of claim 19, wherein identifying the set of attributes comprises:
performing a traversal of both module dependencies and service dependencies using the first service provider module as an initial node comprising:
identifying (a) modules directly depended upon by the first service provider module, and (b) modules that provide a service interface directly used by the first service provider module;
recursively identifying (a) modules directly depended upon by each identified module and (b) modules that provide a service interface directly used by each identified module;
determining a number of modules in a particular set of modules comprising: (a) the first service provider module, (b) modules directly depended upon by any module identified during the traversal, and (c) modules that provide a service interface directly used by any module identified during the traversal.

21. The method of claim 19, wherein a module dependency is a dependency indicated by a first module on a second module, whereby the second module must be present in order for the first module to be at least one of compiled and executed.

22. The method of claim 19, wherein a service dependency is a dependency from a particular module to a set of one or more module in which (a) the particular module indicates that the particular module uses a service interface and (b) each of the set of modules indicates a provision of the service interface.

23. The method of claim 19, wherein the set of attributes further comprise at least one of: (a) a third attribute associated with module dependencies corresponding to the second service provider module, and (b) a fourth attribute associated with service dependencies corresponding to the second service provider module.

24. The method of claim 19, further comprising:
generating a ranked set of instances of service implementations based on the ranking of at least the subset of the plurality of service provider modules.

25. A system comprising:
at least one device including a hardware processor;
the system being configured to perform operations comprising:
identifying a plurality of service provider modules in a module system, wherein the module system specifies accessibility of each service provider module in the plurality of service provider modules to other modules in the plurality of service provider modules, the plurality of service provider modules comprising a first service provider module and a second service provider module;
wherein each of the plurality of service provider modules includes (a) a respective service implementation that implements a particular service interface, and (b) a respective explicit declaration indicating that the respective service provider module provides the particular service interface by means of the respective service implementation;
identifying a set of attributes comprising at least one of: (a) a first attribute associated with module dependencies corresponding to the first service provider module, and (b) a second attribute associated with service dependencies corresponding to the first service provider module;
wherein each module dependency is explicitly indicated by at least one module;
wherein each service dependency is associated with a use of a service interface that is explicitly indicated by at least one module;
based on at least one of the set of attributes: generating a ranking of at least a subset of the plurality of service provider modules, wherein the ranking of a particular service provider module, in the subset of the plurality of service provider modules, is based at least on a source of the particular service provider module.

26. The system of claim 25, wherein identifying the set of attributes comprises:
performing a traversal of both module dependencies and service dependencies using the first service provider module as an initial node comprising:
identifying (a) modules directly depended upon by the first service provider module, and (b) modules that provide a service interface directly used by the first service provider module;
recursively identifying (a) modules directly depended upon by each identified module and (b) modules that provide a service interface directly used by each identified module;
determining a number of modules in a particular set of modules comprising: (a) the first service provider module, (b) modules directly depended upon by any module identified during the traversal, and (c) modules that provide a service interface directly used by any module identified during the traversal.

27. The system of claim 25, wherein a module dependency is a dependency indicated by a first module on a second module, whereby the second module must be present in order for the first module to be at least one of compiled and executed.

28. The system of claim 25, wherein a service dependency is a dependency from a particular module to a set of one or more module in which (a) the particular module indicates that the particular module uses a service interface and (b) each of the set of modules indicates a provision of the service interface.

29. The system of claim 25, wherein the set of attributes further comprise at least one of: (a) a third attribute associated with module dependencies corresponding to the second service provider module, and (b) a fourth attribute associated with service dependencies corresponding to the second service provider module.

30. The system of claim 25, wherein the operations further comprise: generating a ranked set of instances of service implementations based on the ranking of at least the subset of the plurality of service provider modules.

* * * * *